US005502449A

United States Patent [19]
Hiltz et al.

[11] Patent Number: 5,502,449
[45] Date of Patent: Mar. 26, 1996

[54] GROUND UNIT FOR THE DETECTION, IDENTIFICATION, AND DIRECTION DETERMINATION OF A MARKER BEACON

[75] Inventors: Frederick F. Hiltz, Newport, R.I.; Charles E. Wilson, Clarksville, Md.

[73] Assignee: The United States of America as represented by the Secretary of the Navy, Washington, D.C.

[21] Appl. No.: 216,560

[22] Filed: Mar. 23, 1994

[51] Int. Cl.⁶ ................................................ G01S 5/02
[52] U.S. Cl. .................... 342/417; 342/419; 342/433
[58] Field of Search ................................ 342/417, 419, 342/385, 407, 433

[56] References Cited

U.S. PATENT DOCUMENTS

| | | | |
|---|---|---|---|
| 4,001,828 | 1/1977 | Culpepper | 342/446 |
| 4,680,587 | 7/1987 | Chisholm | 342/33 |
| 5,121,126 | 6/1992 | Clagett | 342/419 |
| 5,173,709 | 12/1992 | Lauro et al. | 342/443 |

Primary Examiner—Thomas H. Tarcza
Assistant Examiner—Dao L. Pham
Attorney, Agent, or Firm—Michael J. McGowan; Prithvi C. Lall; Michael F. Oglo

[57] ABSTRACT

A ground unit capable of being carried on the back of a member of the armed forces is used in conjunction with a marker beacon. The ground unit detects and identifies the signals from the marker beacon and is also capable of indicating the direction in which the marker beacon is located. For identification purposes, a received signal at the ground unit from the beacon is checked with a known identification code signal inserted in the ground unit by the user. Upon detection of the signal the user can determine the direction to the marker beacon by scanning with a hand-held antenna system. Visual and audio information is provided to the user.

1 Claim, 25 Drawing Sheets

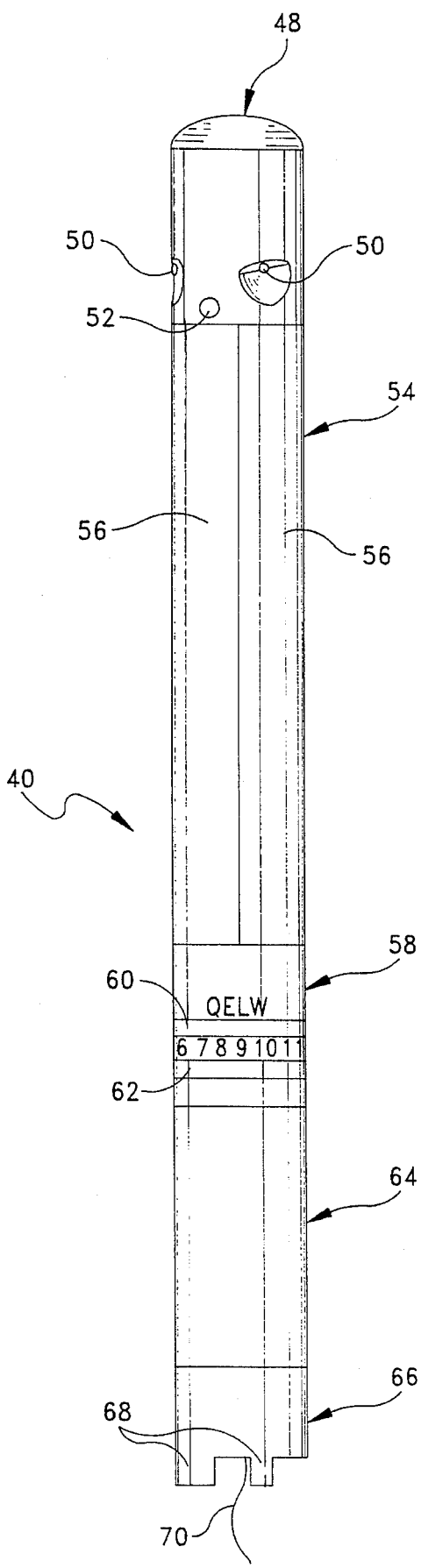
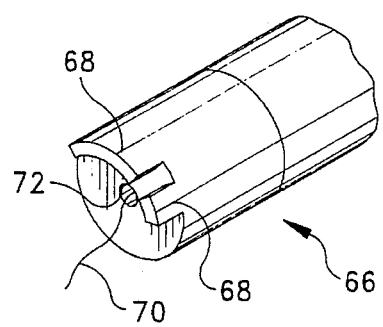
FIG. 2B
FIG. 2A

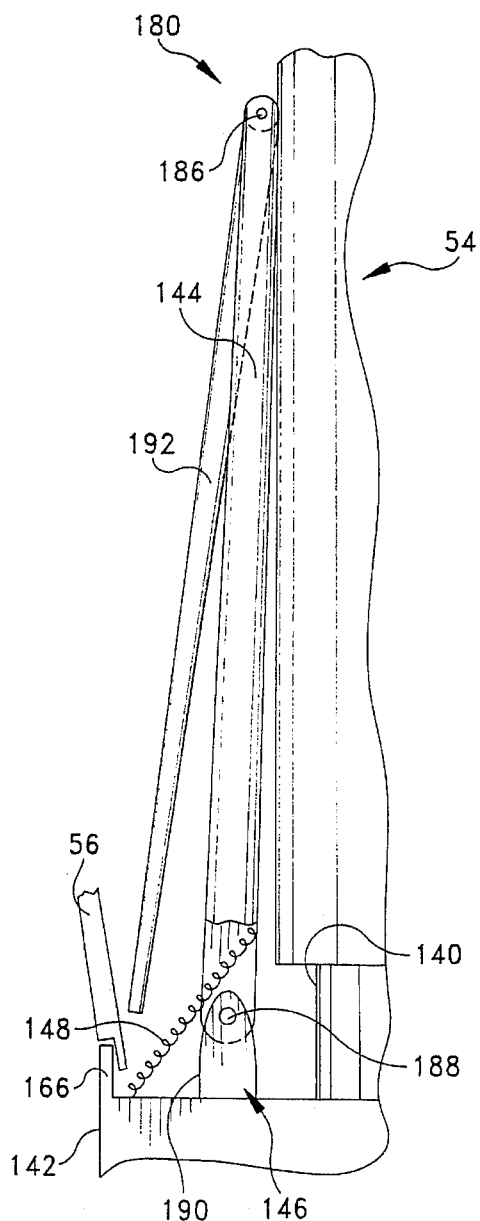
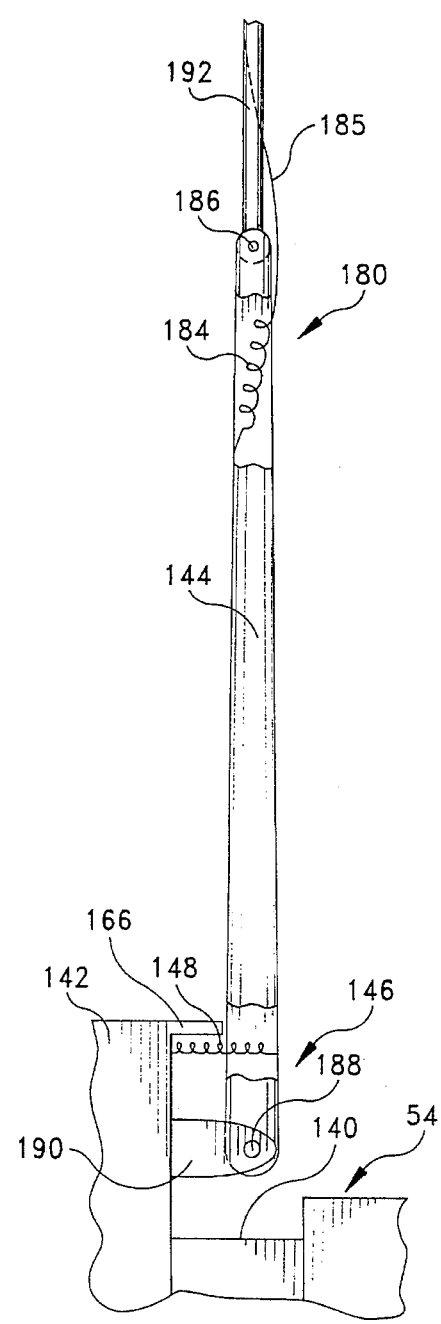
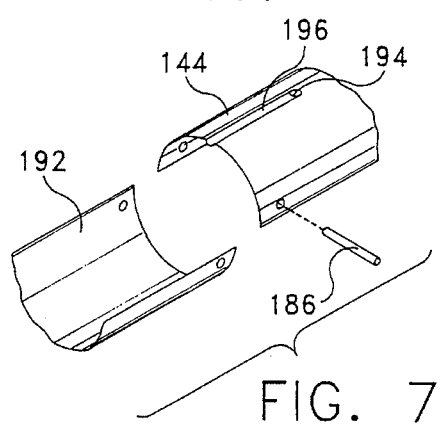
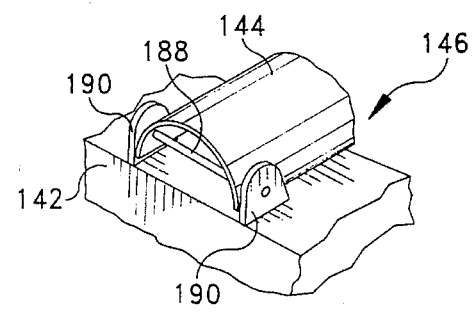
FIG. 7A
FIG. 7B
FIG. 7C
FIG. 7D

FIG. 9H — BEAC. RCPTN SQUIB IGN CODE
FIG. 9I — COMPOSITE BEAC. XMSN(S)
FIG. 9J — COMPOSITE PLAT. XMSN(S)

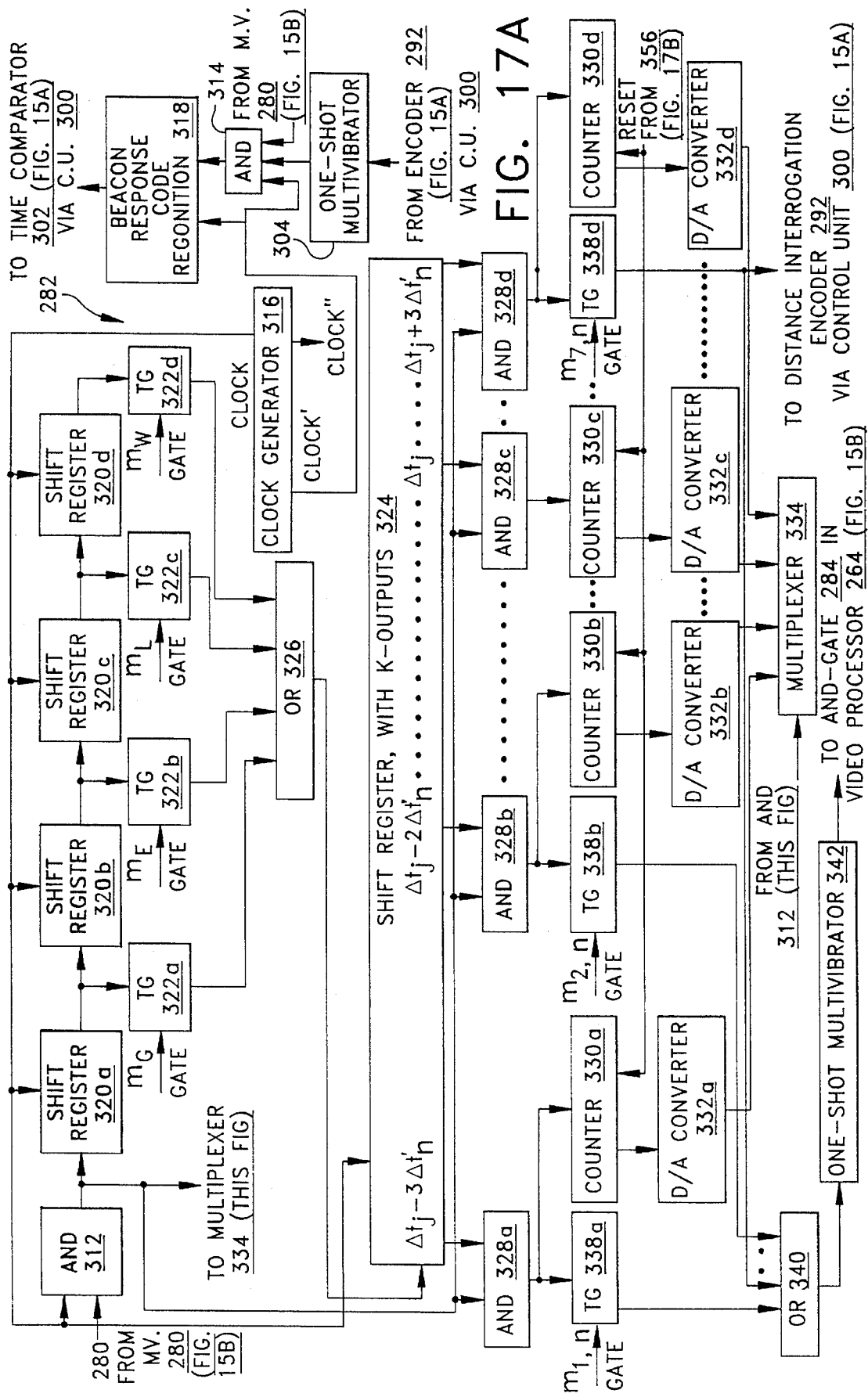

005,502,449

GROUND UNIT FOR THE DETECTION, IDENTIFICATION, AND DIRECTION DETERMINATION OF A MARKER BEACON

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

This patent application is co-pending with five related patent applications titled Marker Beacon Case, now U.S. Pat. No. 5,390,581; Launcher Tube Deployed Marker Beacon Including Settlement Atop Foliage Feature, U.S. patent application Ser. No. 08/216,561; System for Broadcasting Marker Beacon Signals and Processing Responses from Seeking Entities, now U.S. patent application Ser. No. 08/216,567; An Airborne System for Operation in Conjunction with a Marker Beacon, U.S. Pat. No. 5,442,356; and Flare-Antenna Unit for System in Which Flare is Remotely Activated by Radio all by the same inventors, now U.S. Pat. No. 5,427,032.

BACKGROUND OF THE INVENTION (1) Field of the Invention

The present invention relates to a system for enabling ground forces to verify that a marker beacon is functioning after being deployed by ground forces and prior to their departure from the starting site of their deployment to the marker beacon. In addition, the system provides a means by which the same or other friendly forces can detect the beacon's transmissions, identify the beacon(s) of interest, and navigate to the beacon of interest at a later time.

(2) Description of the Prior Art

Deployment of a marker beacon is common when ground forces are operating in nonfriendly territory. Deployment of the beacon may be for the purpose of supply, reinforcement or evacuation of these forces. Deployment of a beacon also may be for the purpose of marking a site for future aerial strikes, such as when the ground forces discover an arms cache; the strikes to be conducted after the forces leave the area. A beacon also may be deployed to mark a site to which the ground forces desire to return, and other means of accurately marking or identifying the site either are not available or feasible.

Ground forces on foot should carry the minimum amount of equipment required for their mission and still maintain effective mobility. Therefore, the means to effect the verification of operation, the detection of, and homing to a beacon should use a minimum of equipment dedicated to that particular function; both in size and weight.

The prior art discloses some features that could be modified for use in the present invention. However, there appears to be no teaching of combining any of these features to provide a device capable of the functions of detecting, identifying, and indicating the direction to a marker beacon as shown in the present invention.

SUMMARY OF THE INVENTION

Accordingly, it is a general purpose and object of the present invention to provide a system capable of detecting, identifying, and indicating the direction to a marker beacon. It is a further object that the system be compact and light in weight so as to be carried by a member of ground forces. Other objects are that the system be rugged and relatively easy to operate.

These objects are accomplished with the present invention by providing a system which detects a marker beacon's known identification code signal. The system has a handheld antenna pair that is scanned until it points to the location from which the code signal emanates. The entire system is capable of being carried on the back of a member of the ground forces. Visual and audio information is provided to the user of the equipment.

BRIEF DESCRIPTION OF THE DRAWINGS

A more complete understanding of the invention and many of the attendant advantages thereto will be readily appreciated as the same becomes better understood by reference to the following detailed description, when considered in conjunction with the accompanying drawings, wherein:

FIGS. 2A and 2B are views of a nondeployed marker beacon suitable for the deployment shown in FIG. 1;

FIG. 7A is a view of the nondeployed beacon's folded counterpoise;

FIG. 7B is a view of the deployed beacon's extended counterpoise;

FIG. 7C shows the alignment of the arm segments of the deployed beacon's extended counterpoise;

FIG. 7D show a portion of the pivot assembly of the counterpoise;

FIG. 17A is a block diagram of the correlator of FIG. 15A;

DESCRIPTION OF THE PREFERRED EMBODIMENT (1) General Operation

Figure 1:
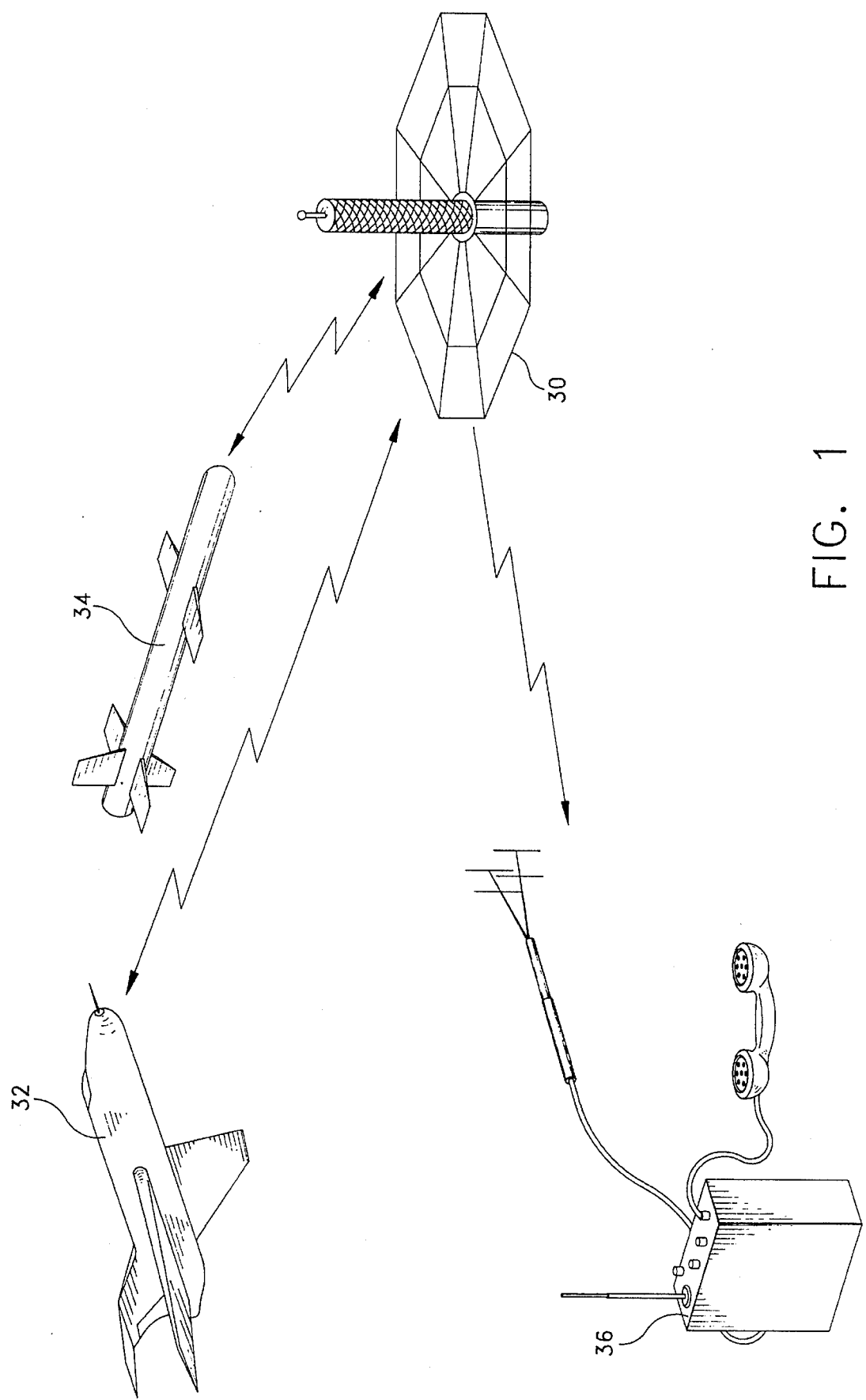
FIG. 1 is an overall view of the operation of a deployed marker beacon system in accordance with the present invention.

Refer now to FIG. 1 for a pictorial representation of a deployed and operational marker beacon system. The system has two main parts. The first part is a deployed marker beacon It is deployed by personnel on the ground or water surface. The deployed marker beacon emits a coded electromagnetic (radio) signal; wherein the code is preset prior to beacon deployment. The coded signal is comprised of two parts, MODE and CODE. MODE is used to identify the purpose of the beacon deployment; for example, search and rescue. The CODE portion is for the purpose of individual beacon identification.

The second part of the deployed and operational marker beacon system is located in the entity which is being used to detect the coded radio signal transmitted by the beacon 30. That portion of the system may be physically installed in an aerial platform such as a manned aircraft 32, an unmanned cruise missile 34, or in a ground unit such as a transceiver backpack 36.

After the particular beacon of interest has been identified and initial homing established, the airborne portion of the system transmits a coded signal to the beacon 30. After recognizing the signal the beacon 30 transmit a signal back to the airborne unit 32 or 34. The airborne unit 32 or 34 processes the returned signal to ascertain the slant range between the beacon 30 and the airborne unit 32 or 34. In addition, at a predetermined slant range separation, the airborne unit 32 or 34 may transmit another coded signal to the beacon 30. That signal, upon recognition by the beacon 30, activates a flare system (or infrared emitter system) for the purpose of visual and/or infrared homing to the beacon 30. The manned aircraft 32 differs in operation from the cruise missile 34 in that the manned aircraft 32 has, in addition to the above, the option of manually activating the flare system on the beacon 30 for visual and/or infrared homing.

(2) General Composition of the Nondeployed Marker Beacon 40

Refer now to FIGS. 2A and 2B for a description of a nondeployed marker beacon 40. A distinction will be made throughout between the deployed beacon 30 of FIG. 1 and the nondeployed beacon 40. Components are present in the nondeployed marker beacon 40 that have been shed by the deployed marker beacon 30. The nondeployed marker beacon 40 shown in FIG. 2A has five main parts. Beginning with the uppermost part shown in FIG. 2A, the five main parts are: the motor 48, with its canted exhaust nozzles 50 and percussion primer 52; the flare-antenna assembly 54, with its segmented fiberglass shroud 56; the electronics assembly 58, with its MODE switch 60 and its CODE switch 62; the battery compartment 64; and the tether assembly 66, with its keying tabs 68. Extending from the tether assembly 66 is the tether 70. FIG. 2B shows the tether assembly 66 with the keying tabs 68 and the tether 70 extending from an aperture 72.

(3) Marker Beacon Case 74 for Use in Storing, Carrying, and Launching

Figure 3A:
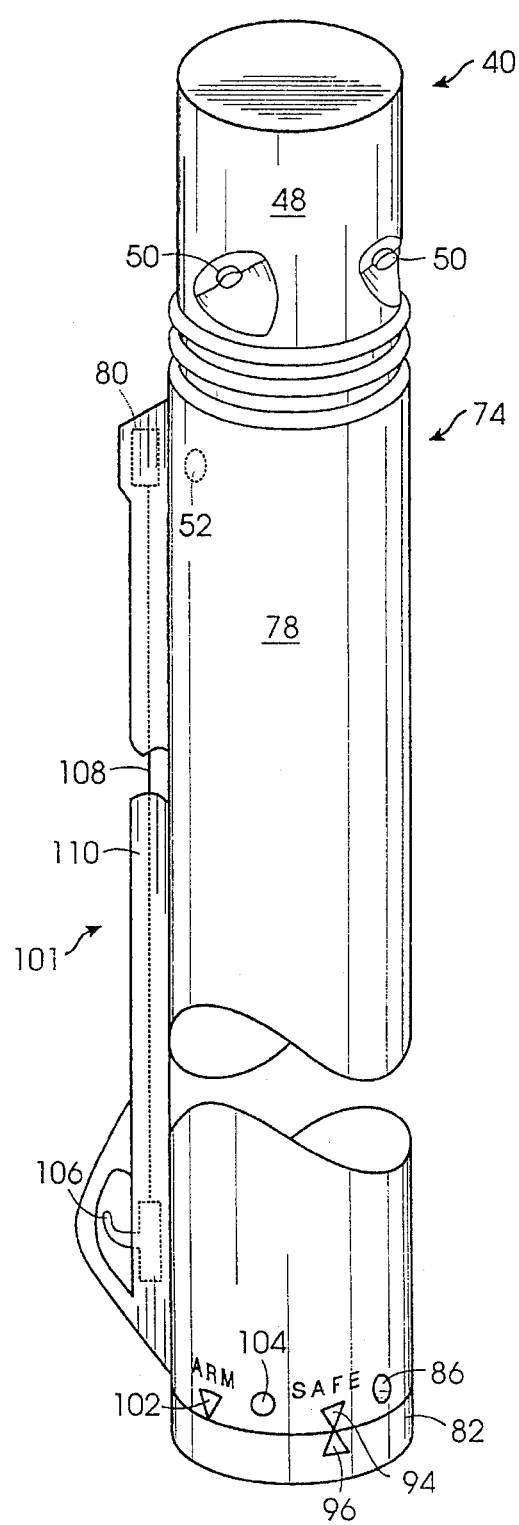
FIGS. 3A and 3B combined show a pictorial representation of a beacon storage/carrying/launching case holding the nondeployed marker beacon of FIG. 2A.
Figure 3B:
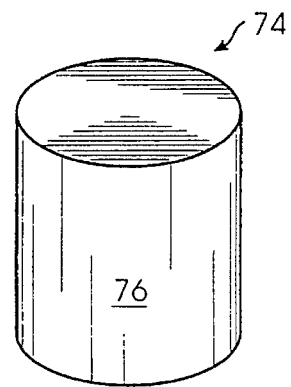
Figure 3C:
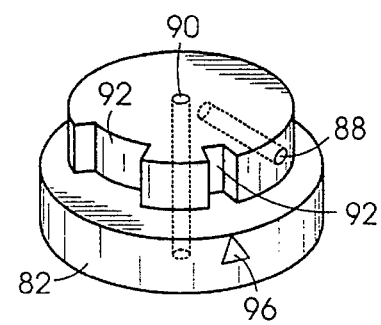
FIGS. 3C and 3D show components that are part of the beacon storage/carrying/launching case of FIGS. 3A and 3B.
Figure 3D:
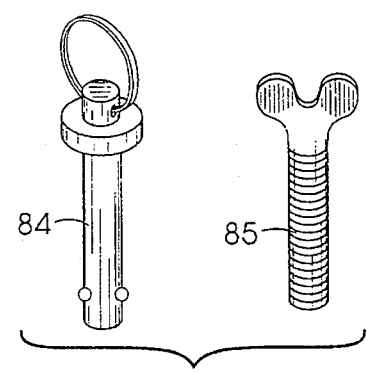
Figure 3E:
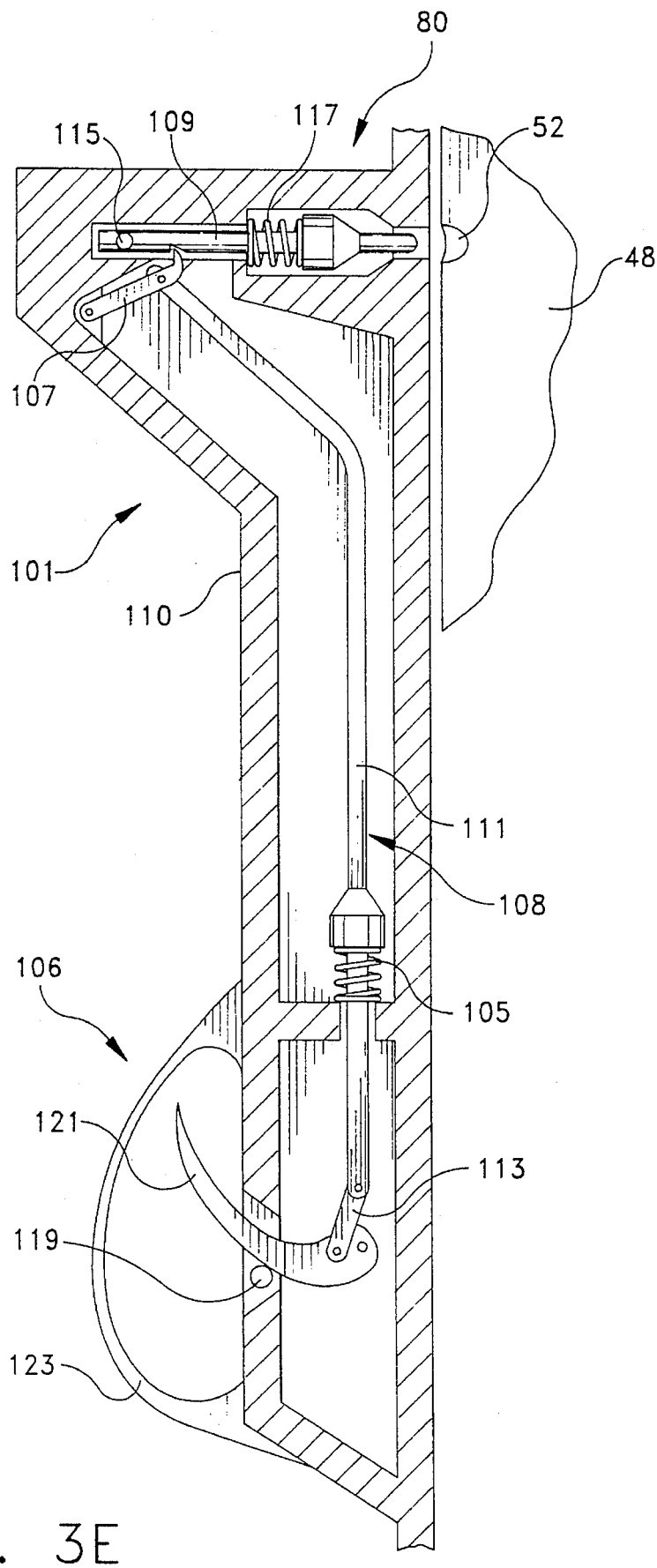
FIG. 3E is a detail of the triggering mechanism components of the beacon storage/carrying/launching case of FIG. 3A.

FIGS. 3A and 3B depict a case 74 holding the nondeployed marker beacon 40 of FIGS. 2A and 2B. Only the motor 48 of beacon 40 is shown. The case 74 is suitable for carrying storing and/or launching the nondeployed marker beacon 40. Case 74 is employed when it is anticipated that the marker beacon 40 may have to be deployed through foliage and operate from on top of the foliage. When there is no such requirement, the storage/carrying case may be very simple, and it need not contain the capabilities required to launch the beacon 40. To assemble the beacon 40 with its case 74 the following sequence is followed. The case's cap 76 is removed from the substantially cylindrical main body 78. Refer additionally to FIGS. 3C, 3D, and 3E. The case bore is checked to ensure that the hammer/firing pin 80 is not protruding into the bore. The base cap 82 is removed after removing the pin 84 or a threaded bolt 85 from a base cap alignment aperture 88 and a safe alignment aperture 86 in body 78.

Refer now additionally to FIGS. 2A and 2B. If the MODE switch 60 and the CODE switch 62 have not been previously set to the desired positions, they are set at this time. The tether 70 is fed through the tether feed aperture 90 in the base cap 82. The beacon's keying tabs 68 are mated with the keying slots 92 in the base cap 82 to prevent rotation of the case 74 with respect to the marker beacon 40. The cylindrical main body 78 of the case 74 is then slid over the beacon 40. The safe alignment aperture 86 is aligned with the base cap alignment aperture 88 using a SAFE index marker 94 in body 78 and a base cap index marker 96. The pin 84 or threaded bolt 85 is then inserted through the safe alignment aperture 86 into the base cap alignment aperture 88 to lock the beacon 40 in the SAFE position, i.e., the percussion primer 52 is not in alignment with the hammer/firing pin 80. The cap 76 is then screwed onto the main body 78 of the case 74.

(4) Deploying the Beacon 40 from the Case 74

The beacon 40 can be removed manually from its case 74 by the user for deployment. The sequence for the deployment operation starts with removing the case's cap 76 and extricating the beacon 40 from the cylindrical main body 78 of the case 74. The beacon 40 then has its motor 48 and fiberglass shroud 56 removed by holding the main body of the beacon 40 and pulling on the motor 48. The MODE switch 60 and the CODE switch 62 settings are then verified and reset if necessary.

Figure 4A:
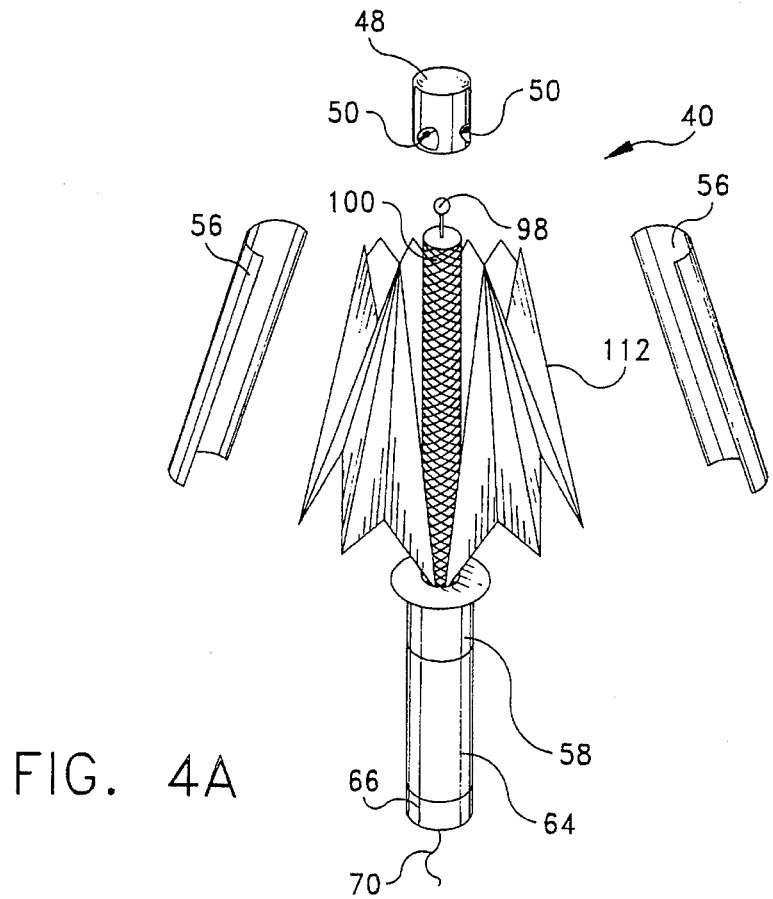
FIG. 4A is a view of the beacon being deployed.
Figure 4B:
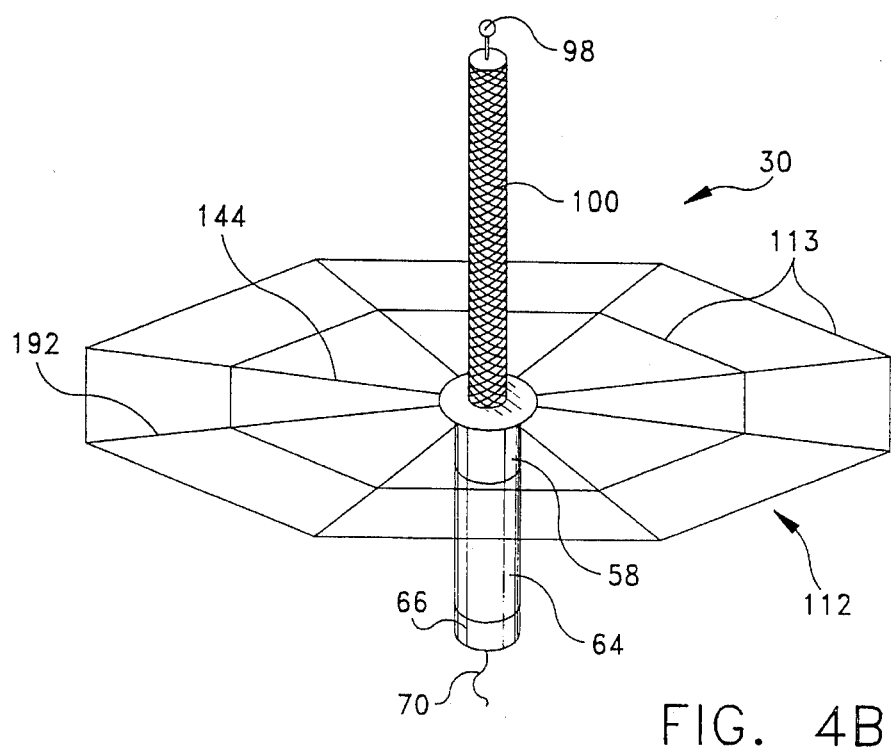
FIG. 4B is a view of the deployed beacon.

Refer now additionally to FIGS. 4A and 4B. The ball functions as part of a switch and is pushed to activate the electronics assembly 58. The activated beacon 30 is then placed in a suitable location and position and left. The activated beacon 30 is also capable of being hand-held.

FIG. 4A shows the nondeployed marker beacon 40 in the process of deploying. FIG. 4B shows the deployed beacon 30. Note that a counterpoise 112 will automatically deploy upon removal of the motor 48 and the shroud 56. In the situation of a downed airman, the position of the MODE switch 60 and the CODE switch 62 would have been verified prior to the mission, and there would only be one beacon 40 in his possession. Therefore, verification during the deployment procedure would not be necessary in this instance.

An alternative location positioning of the beacon 30 may require it to be projected above foliage (e.g., a jungle canopy) and have it located on top of the foliage during its operational life. The purpose of launching the nondeployed beacon 40 and having the deployed beacon 30 located on top of any foliage would be to minimize the attenuation of the beacon's 30 radio transmissions and to minimize its visual detection by nonfriendly forces if they arrive at the deployment site after the deploying personnel have left the area. This deployment would also increase visual detection of the beacon's flare-antenna 100 after flare activation by the navigating entity.

The launch sequence for positioning the beacon 30 so that it projects above foliage would begin by the user removing the top cap 76 from the cylindrical main body 78 of the case 74. If the settings of the MODE and CODE switches 60 and 62 have not been verified prior to this time, the nondeployed beacon 40 would be removed from the cylindrical main body 78 of the case 74, the MODE and CODE switches 60 and 62 positions verified, and the nondeployed beacon 40 reinserted into the cylindrical main body 78 of the case 74. The distance to the top of the foliage would be estimated by the user. The tether 70, having distance markings along its length would be pulled from the tether assembly 66 until the desired length (estimated distance to the top of the foliage plus a "safety factor") is achieved. The free end of the tether 70 is then secured to the main body 78 of the case 74 or some other stationary object such as a tree. The pin 84 or threaded bolt 85 is then removed from the apertures and 88. The base cap 82 is rotated until the base cap index marker 96 is aligned with the ARM index 102 of the main body 78, at which time the pin 84 or threaded bolt 85 is inserted into the alignment apertures 104 and 88. This action places the percussion primer 52 in alignment with the hammer/firing pin 80.

The assembly is aimed at the spot where it is desired to locate the deployed beacon 30. The beacon motor 48 is activated, via a trigger assembly 106 and its linkage 108, to the hammer/firing pin 80, which causes the primer 52 to detonate. Trigger assembly 106, its linkage 108, and the hammer/firing pin 80 are encased in a housing 110. The triggering mechanism 101 is best shown in FIG. 3E. The triggering mechanism 101 in housing 110 is shown in safe ready-to-fire configuration. Spring 105 is in the expanded state holding pawl 107 in the detent of firing-pin piston 109 via linkages 111 and 113. The firing pin piston 109 has been pulled back to the position shown by the bar 115 affixed to the firing pin piston 109, allowing the pawl 107 to engage and placing the spring 117 under compression. The safety pin 119 holds the trigger 121, within trigger guard 123, in the position shown, thus holding the linkages 111 and 113 and the pawl 107 in a safe nonfire position. Moving safety pin 119 so that the trigger 121 can be moved back removes the safe configuration. Pulling the trigger 121 back removes the pawl 107 from the detent in the firing-pin piston 109 via linkages 111 and 113. Removal of the pawl 107 from the detent allows the spring 117 to move the firing-pin piston 109 into contact with the primer 52 contained in the rocket motor assembly 48 causing the primer 52 to detonate, thereby activating motor 48.

Upon motor 48 activation, the nondeployed beacon 40 is pulled from the main body 78 of the case 74 by the motor 48 and projected upwards. The exhaust nozzles 50 in the motor 48 are canted with respect to the longitudinal axis of the motor 48. The cant angle for the exhaust produces a stabilizing spiralling of the beacon 40 as it follows its trajectory upwards. FIG. 4A depicts the beacon 40 after launch and at the point where the tether 70 has reached its length limit; thereby activating the release of the motor 48 and the fiberglass shroud pieces 56. Partial deployment of the counterpoise 112 has occurred. Integral with the release of the motor 48 and the shroud 56, the release mechanism connects the batteries in the battery compartment 64 to the electronics contained in the electronics assembly 58.

After the separation of the motor 48 and the shroud 56, and the extension of the counterpoise 112, the beacon 30 settles and is retained on top of the foliage/canopy by the counterpoise 112 with its wire strands 113, inner arms 144, and outer arms 192.

(5) Flare-Antenna Assembly 54

Figure 5A:
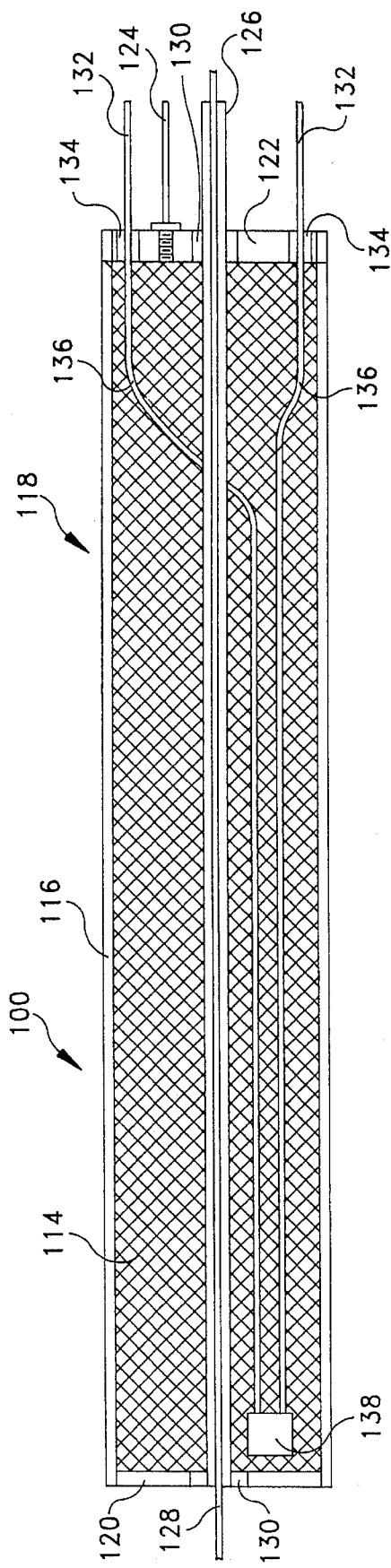
FIG. 5A is a view of a flare-antenna assembly.

The flare-antenna 100 portion of the flare-antenna assembly 54 (FIG. 2A) is depicted in FIG. 5A. The flare-antenna 100 comprises a flare material 114 contained within a cylinder 116 of conductive materials that comprise the antenna 118. The side of the cylinder 116 is comprised of a fine wire mesh 117 that also covers its top 120. The base 122 of the cylinder 116 is made of solid metal, bonded both mechanically and electrically to the fine wire mesh 117 of the cylinder 116. The base 122 is thick enough to retain a threaded RF connector pin 124. Along the center line of the flare-antenna 100, there is a hollow tube 126, through which a nonmetallic rod 128 is passed. The rod 128 is an integral part of the release mechanism for the motor 48 (FIG. 2A) and shroud 56 (FIG. 2A). The tube 126 is electrically isolated from the antenna 118 by insulating beads 130 at each end. Two pins 132 are fed through the base 122 of the flare antenna 100 and isolated from the base 122 by insulating beads 134. The two pins 132 are connected to squib wires 136, which in turn are connected to a squib 138. An electrical pulse, generated within the electronics, flows through the pins 132 and the wires 136 to cause the squib 138 to detonate. The detonation ignites the flare material 114. The flare material 114 burns from the squib 138 end towards the base of the flare-antenna 100; destroying the antenna 118 in the process.

Figure 5B:
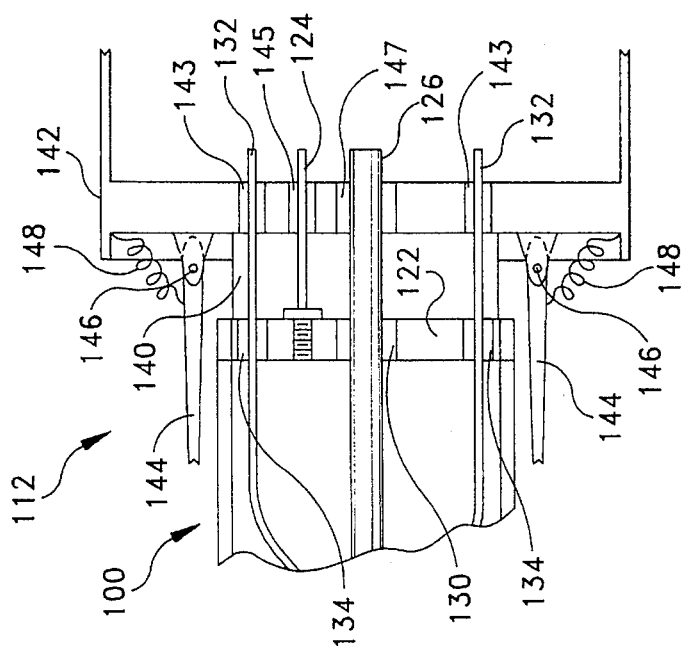
FIG. 5B is a view showing the mounting of the flare-antenna assembly of FIG. 5A.

Refer now to FIG. 5B. The flare-antenna 100 is bonded to an insulating spacer 140 after the tube 126 and the pins 132 and 124 are fully inserted in corresponding apertures in the spacer 140. The tube 126 and the pins 132 and 124 are inserted into corresponding apertures in an electronic assembly case 142 for the electronic assembly 58 (FIG. 2A). The spacer 140 is bonded to the electronic assembly case 142. The electronic assembly case 142 has insulation beads 143, 145, and 147.

Surrounding the flare-antenna 100 is the counterpoise 112, which is attached to the electronic assembly case 142. The attachment interface between the counterpoise inner arm segments 144 and the electronic assembly case 142 is through individual pivot assemblies 146. Springs 148 are affixed to the inner arm segments 144 and the electronic assembly case 142.

(6) Motor 48 and Shroud 56 Release Mechanism

The motor 48 and shroud 56 release mechanism is depicted in FIGS. 6A–6F. The ball 98 is attached to the nonmetallic rod 128. The rod 128 extends through the tube 126 in the flare-antenna assembly 54, and then through the electronics assembly 58 (FIG. 2A) into the battery compartment 64 (FIG. 2A). In the battery compartment 64 the rod 128 forms one part of the power ON-OFF switch 152, via a conductive metal plating 154 on nonmetallic rod 128. The other parts of the switch 152 are the contacts 156 and 158, which connect to the electronics 58 (FIG. 2A) and the positive terminals of the batteries within battery compartment 64, respectively. Prior to deployment the switch 152 is in an electrically open position. On deployment the rod 128 is pulled towards the base of the beacon 30 (FIG. 4B) by the tether 70 (FIG. 4B) reaching the end of its travel or by the user manually pushing the rod 128 in that direction via the ball 98. The plating 154 on the rod 128 completes the circuit between the batteries within battery compartment 64 and the electronics 58. The switch 152 is then in an electrically closed position.

The rod 128 is prevented from being removed upwardly by an attached disc 162, which may be located in either the electronics assembly case 142 or the battery compartment 64. For illustrative purposes, the disc 162 is shown as being located in the electronics assembly case 142.

Figure 6A:
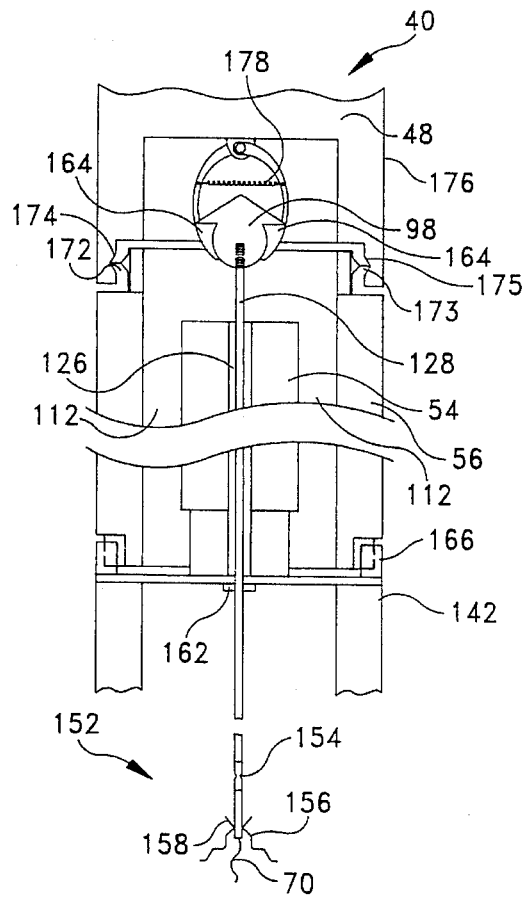
FIG. 6A is a view of the marker beacon's shroud and motor release mechanism, and the power activation mechanism.
Figure 6F:
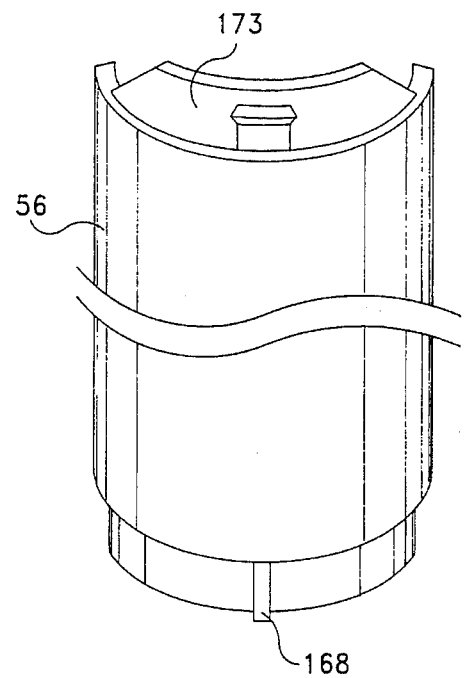
FIG. 6F is a pictorial representation of a half shroud of FIG. 6A.
Figure 6B:
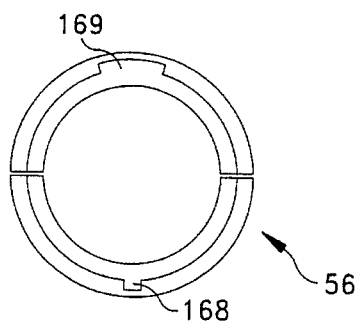
FIG. 6B is a bottom view of the shroud of FIG. 6A.
Figure 6C:
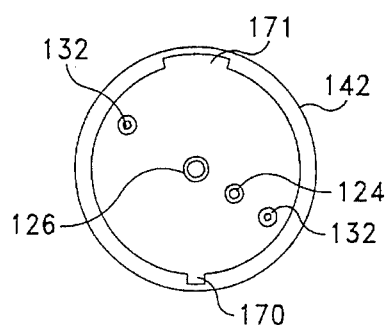
FIG. 6C is a top view of the electronic case of FIG. 6A.
Figure 6D:
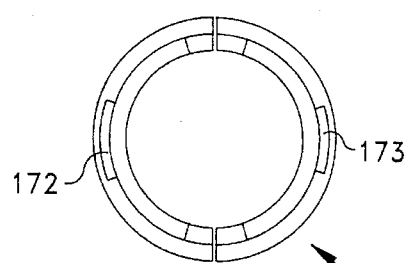
FIG. 6D is a top view of the shroud of FIG. 6A.
Figure 6E:
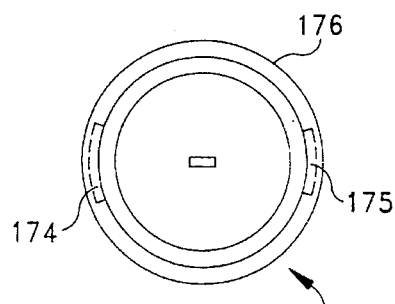
FIG. 6E is a bottom view of the motor of FIG. 6A.

During initial assembly of the nondeployed beacon 40, the ball 98 is threaded onto the rod 128. The ball 98 is actually comprised of a hemisphere on its lower portion and a conical upper section. The conical section aids in the separation of the claws 164 during the mating process of the motor 48 with the shroud 56. The counterpoise 112 (FIGS. 4A and 4B) is folded so that the shroud 56 has its lower end inserted into the flange 166 at the upper end of the electronics case 142. The shroud halves of shroud 56 have their lower index tabs 168 and 169 inserted in respective slots 170 and 171 in the electronic assembly case 142 as shown in FIGS. 6B and 6C. The shroud 56 is manually held together at its upper end while the motor 48 is mated to it. To mate the motor 48 to the shroud 56, the shroud's V-spring index tabs 172 and 173 are aligned with the index V-slots 174 and 175 that are located on the inside of the flange 176 of the motor 48. The motor 48 is then pushed downward, opening the two claw halves 164 as they are forced over and encompass the ball 98. Final mating is accomplished by full engagement of the V-spring index tabs 172 and 173 with the index V-slots 174 and 175. The tabs 172 and 173 are bonded to their respective shroud halves of shroud 56. The purpose of the indexing/keying between the shroud 56 and the motor 48 as well as between the shroud 56 and the electronics assembly case 142 is to ensure the percussion primer 52 (FIG. 3E) is in alignment with the hammer/firing pin 80 (FIG. 3E) when the system is placed in the ARM position.

The length of the spring 178, between its points of attachment to the two claw halves 164, is such that the lower jaws can easily open as they are pushed down on the ball 98. The spring constant of the spring 178 is such that the jaws of the two claws 164 will not spread open during the launch sequence until the downward force, experienced when the tether 70 has reached its length limit, is overcome by the upward thrust of the motor 48 or by manually pulling on the motor 48 during a nonlaunch deployment. The diameter of the ball 98 is determined by the length of the lower flange of the shroud 56 as the shroud 56 has to clear the electronic assembly case 142 to be released. Once the shroud 56 is clear of the electronic assembly case 142, the automatic extension of the counterpoise 112 forces the lower end of the shroud 56 away. The movement of the shroud 56 causes the V-spring index tabs 172 and 173 on the upper end of the shroud 56 to disengage from the index V-slots 174 and 175 in the lower inside portion of flange 176 of the motor 48.

(7) Counterpoise 112

Refer now to FIGS. 7A–7D for illustrations of a counterpoise arm assembly 180. A plurality of these assemblies 180, along with the wire strands 13 (FIG. 4B) comprise the counterpoise 112 (FIG. 4B). The assembly 180 is comprised of the inner arm 144, an outer arm 192, spring 184, pin 186, and the pivot assembly 146. The pivot assembly 146 is comprised of spring 148, pin 188, and the two supports 190. FIG. 7A depicts the counterpoise assembly 180 in the folded position; i.e., the configuration of a nondeployed beacon 40.

During deployment (FIG. 4A) as the motor 48 (FIG. 4A) pulls the shroud 56 (FIG. 4A) upward during the release process, the spring 148 pulls the inner arm 144 towards the electronic assembly case flange 166 and the spring 184 begins to bring the outer arm 192 to the horizontal. The combined action will cause the counterpoise outer arm 192 to force the shroud 56 outward as the bottom of the shroud 56 clears the flange 166 on the electronic assembly case 142. Full extension of the counterpoise arms 144, 192 is shown in FIG. 7B.

The arm segments 144, 192 are U-shaped and tapered. The outer segment 192 is inverted with respect to inner segment 144 as shown in FIG. 7C. The inversion is to minimize the volume in the folded configuration. Also shown in FIG. 7C at the end of inner arm 144 is an aperture 194 and a groove 196 which is part of the detent arrangement. These form a guide for the wire 185 connecting the spring 184 to the outer arm 192. The pivot assembly 146 is shown, sans its spring 148, in FIG. 7D.

Illustrated in FIG. 4B, but not in FIGS. 7A–7D are the wire strands 113 connecting the plurality of the arm segments 144 and 192 to form the complete counterpoise 112. These wire strands 113 help form the means to support the beacon 30 on top of foliage.

(8) Beacon Electronics, General

Figure 8:
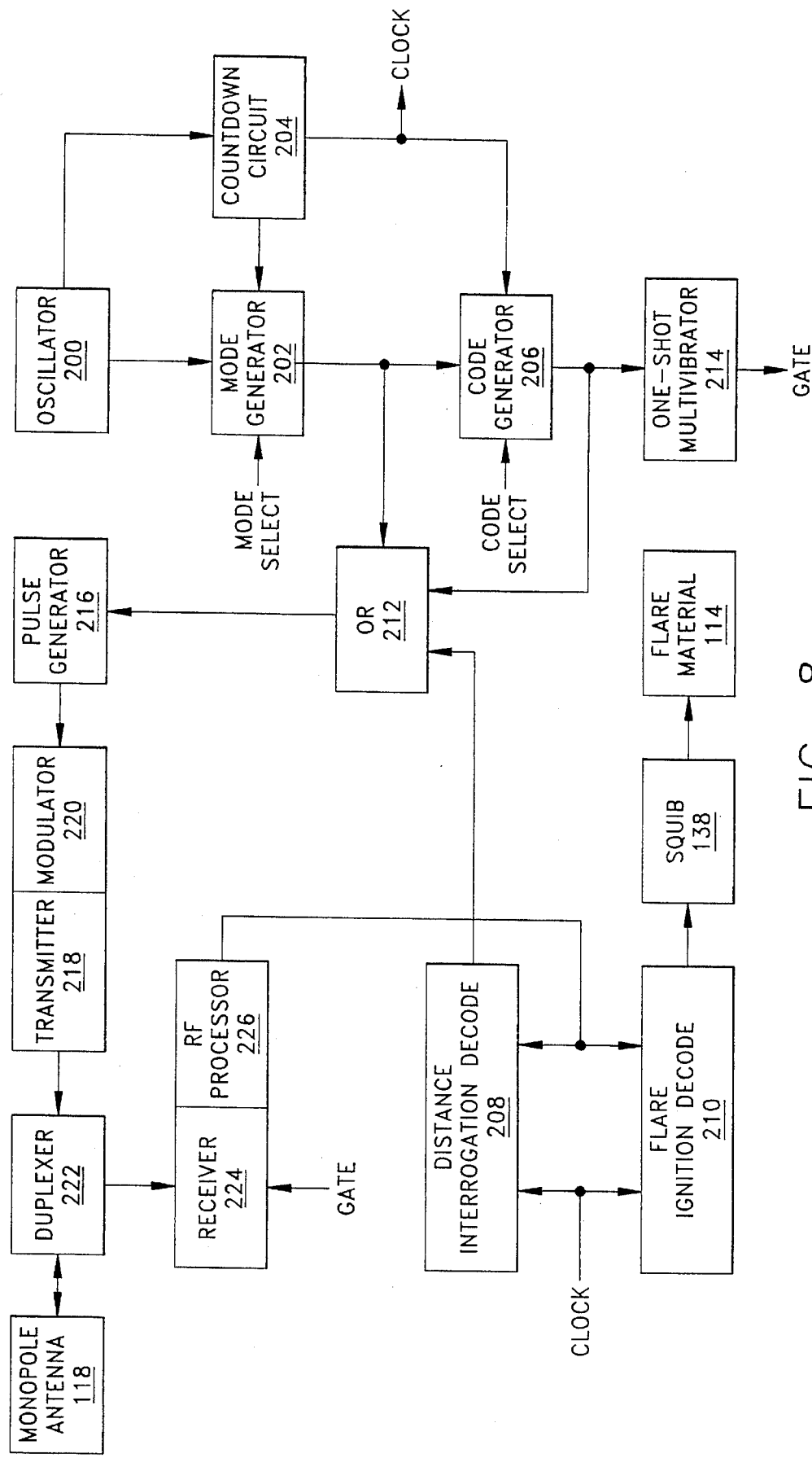
FIG. 8 is a block diagram of the deployed beacon electronics.

Refer now to FIG. 8. The FIG. 8 block diagram will be described as the electronics within deployed beacon 30 (FIGS. 1 and 4B). Power to the electronics is controlled by the power ON-OFF switch 152 activated by rod 128 as previously described with reference to FIG. 6A. The electronics associated with the deployed beacon 30 differs from that of nondeployed beacon 40 (FIGS. 2A and 2B) in that the power ON-OFF switch 152 is closed in the deployed beacon 30 and open in nondeployed beacon 40.

An oscillator 200 produces a continuous train of pulses. The output from the oscillator 200 is fed to the MODE generator 202 and to the countdown circuit 204. The output of the countdown circuit 204 is a series of pulses used as a CLOCK for timing in the CODE generator 206, the MODE generator 202, the distance interrogation decode circuit 208, and the flare ignition decode circuit 210. The output from the MODE generator 202 is fed to the OR-gate 212 and to the CODE generator 202, and is the first pulse in each of the system's coded pulse groups. The timing between the MODE generator's output pulses corresponds to the basic timing between the pulse groups and is determined by the MODE select switch 60 (FIG. 2A) and the CLOCK frequency. The output from the CODE generator 206 forms the remainder of the pulses in the system's coded pulse groups. Timing between the first pulse from the CODE generator 206 and that from the MODE generator 202 is determined by the particular shift register element which the CODE select switch 62 (FIG. 2A) is positioned and the CLOCK frequency. The number of successive pulses from the CODE generator 206 and their intrapulse timing depends upon the number of discrete shift registers used and the location of register output taps fed to the associated sections of switch 62. Details of the shift registers are described later with reference to FIG. 11. The output from CODE generator 206 is also fed to the OR-gate 212. In addition, the last output pulse from the CODE generator 206 is used to trigger the one-shot multivibrator 214.

All of the pulses generated by the MODE generator 202 and the CODE generator 206, comprising each of the system's identification code groups, are passed to the pulse generator 216 as the triggers for that generator 216. The width of the output pulses from the pulse generator 216 control the transmission time of the transmitter 218 via the modulator 220. The output from the transmitter 218 feeds the duplexer 222 and thence the monopole antenna 118.

Signals containing the distance interrogation code and the flare ignition code transmitted from the navigating entity 32 (FIG. 1) or 34 (FIG. 1) are received by the antenna 118 and passed through the duplexer 222 to the receiver 224. The receiver 224, which contains bandpass filtering and signal amplification, passes RF only during the time a gate is received from the one-shot multivibrator 214. The output of receiver 224 is fed to the RF processor 226, which demodulates the received RF signal. The RF processor 226 may also contain pulse width discrimination and additional amplification. After processing, the signal is fed to both the distance interrogation decode and flare ignition decode circuits, 208 and 210, respectively. If the processed RF signal meets the distance interrogation decode criteria, the distance interrogation decode circuit 208 outputs a pulse code to the OR-gate 212; which in turn, results in the transmission of a return pulse code to the navigating entity 32 or 34. The return pulse code is then used by the navigating entity 32 or 34 to determine the slant range distance between it and the beacon 30.

If the processed RF signal fed to the flare ignition decode circuit 210 meets the flare ignition code criteria, a pulse is sent by the flare ignition decode circuit 210 to the squib 138 causing it to detonate and activate the flare material 114.

The gate pulse from the one-shot multivibrator 214 could be used to apply power to the receiver 224, RF processor 226, distance interrogation decode circuit 208, and flare ignition decode circuit 210 instead of being used just to gate the receiver 224. By applying power to the circuits only for the period of time that the distance interrogation and flare ignition code are likely to be received, battery power would be conserved; thereby extending the operational life of the beacon 30.

(9) Relationship of Transmitted/Received Code Groups

Figure 9:
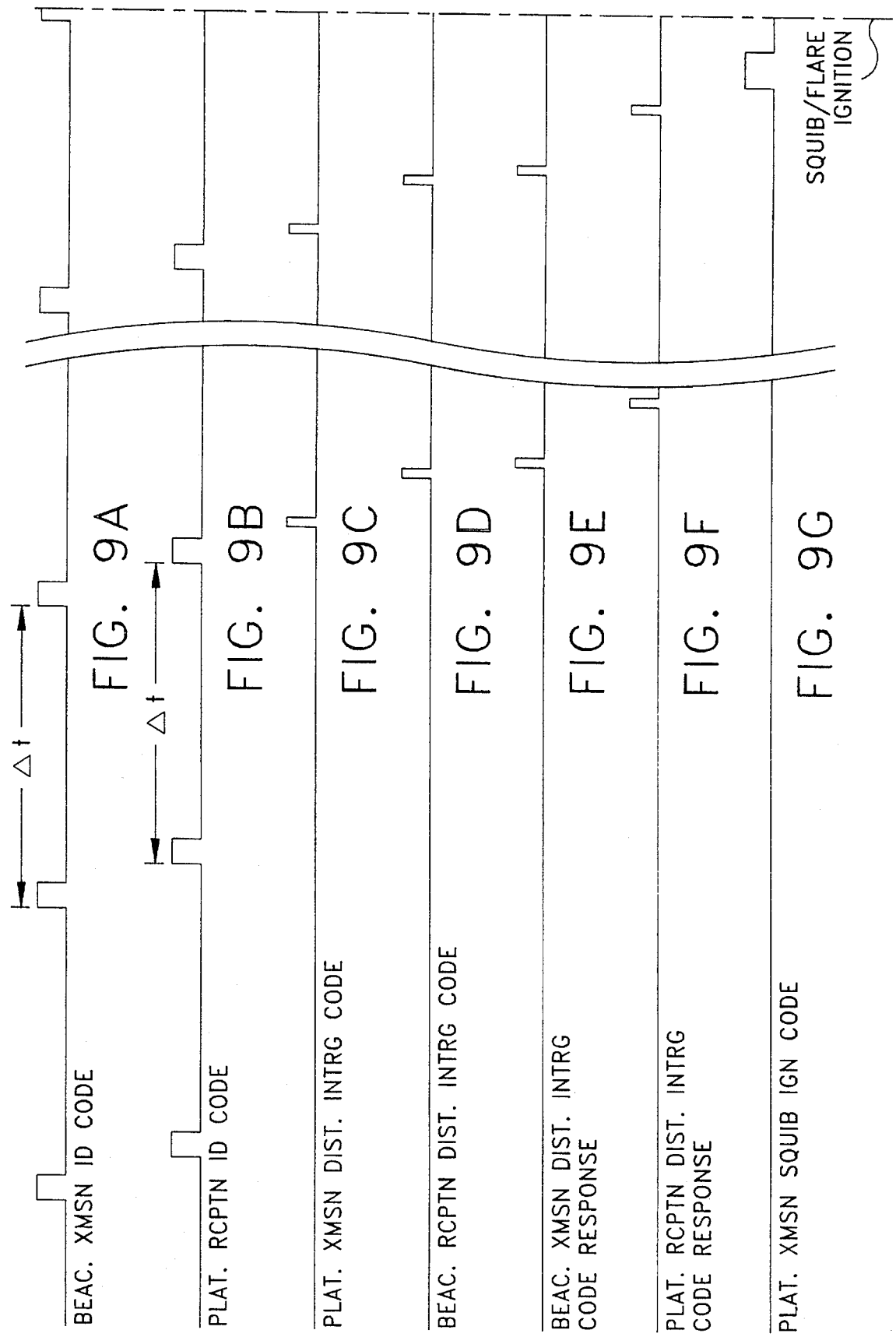
FIGS. 9A–9J show the pulse relationship of transmitted/received code groups.

FIGS. 9A–9J illustrate the general relationships between the envelopes of pulse groups transmitted/received by the beacon 30 and the navigating entity 32 or 34 as shown in FIG. 1. The detailed codes within the envelopes are not depicted. FIG. 9A is the envelope of the coded pulse group transmitted by the beacon 30 for beacon identification. Both MODE and CODE pulses are transmitted in the time within the pulses shown. The time difference indicated by Δt is determined by the MODE switch 60 (FIG. 2A) setting, and is the basic timed output from the beacon 30. Reception of the envelope of RF pulses, shown in FIG. 9A, by the navigating entity 32 or 34 is shown in FIG. 9B. The gate from the one-shot multivibrator 214 (FIG. 8) is initiated within the beacon 30 at the trailing edge of each of the pulses of FIG. 9A. The navigating entity 32 or 34 upon recognizing the desired identification code from beacon 30 will initiate a distance interrogation code whose envelope is shown in FIG. 9C, and which is received by the beacon 30 as the signal shown in FIG. 9D. When the beacon 30 distance interrogation decode circuit 208 (FIG. 8) detects the distance interrogation code of FIG. 9C, it will produce a return pulse code as previously described and whose envelope is illustrated in FIG. 9E. The pulse signal of FIG. 9E received by the navigating entity 32 or 34 is indicated in FIG. 9F. The navigating entity then processes the time difference between the pulses in FIGS. 9C and 9F to ascertain the slant range distance between the beacon 30 and the navigating entity 32 or 34. The time difference is proportional to 2× distance between the beacon 30 and the platform 32 or 34. When the distance becomes equal to or less than a preset value or upon the discretion of the operator in the case where the navigating entity is an aircraft 32 a squib ignition code group to initiate ignition of the flare material 114 (FIG. 8) is sent by the navigation entity 32 or 34. Signal 9G depicts the envelope of the squib ignition code group. Reception of the squib ignition code by the beacon 30 is depicted in FIG. 9H. The composite envelope of the beacon 30 transmission is illustrated in FIG. 9I and represents the combination of signals in FIGS. 9A and 9E. The composite transmission envelope for the navigating entity 32 or 34 is illustrated in FIG. 9J. The FIGS. 9A–9J signals are shown ending at the time the of flare material 114 ignition. In actuality the beacon signals shown in FIGS. 9A and 9E terminate if the flare material 114 ignition causes destruction of the electronics in the beacon 30 by detonation of an explosive charge or by other means of destruction such as thermite.

Contained within the envelopes depicted in FIG. 9A are the pulses generated by the beacon 30 for identification. A representative illustration of a pulse identification code is shown is FIG. 10. The pulses depicted are themselves the envelopes of the transmitted RF signal. The actual number employed would be determined after consideration of detectability by nonfriendly forces compared to the detection, identification, and homing capabilities of the desired navigating entity. The more the number of pulses within a code group, the more probable will be the detection by nonfriendly forces. The exact number of pulses within a code group, in conjunction with other design characteristics of the beacon 30 and the electronics in the navigating entity, would be determined by the user, and are not germane to the principle concept. Therefore, for illustrative purposes, four pulses within a pulse code group are shown. Similarly, four MODEs are depicted throughout for illustrative purposes, and it is not to be inferred that the number is sacrosanct.

Figure 10:
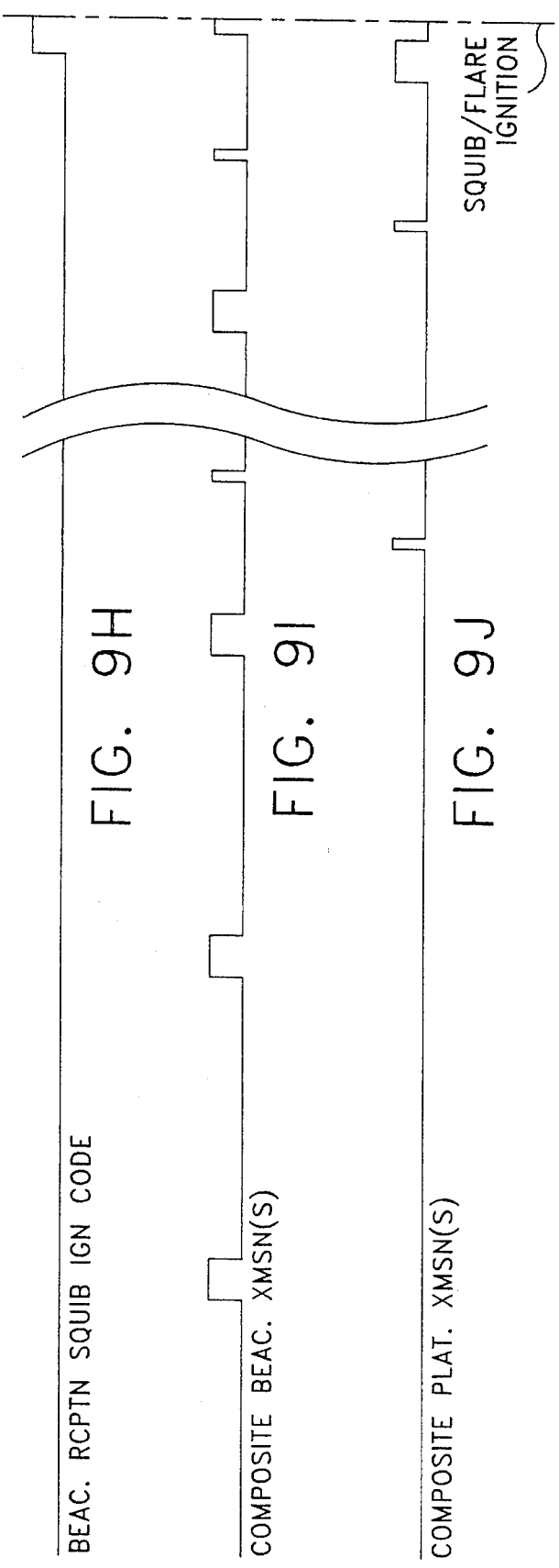
FIG. 10 is an example of the deployed beacon MODE/CODE transmitted pulse code group timing.

In FIG. 10, the Δt shown is the same as the Δt in FIGS. 9A and 9B. The envelopes depicted in FIGS. 9A and 9B represent the pulse groups from the leading edge of the first pulse to the trailing edge of the last pulse in each pulse group shown in FIG. 10. The MODE switch 60 determines the value of Δt used in any particular situation. The pulse spacings $\Delta t_1$, $\Delta t_2$, and $\Delta t_3$ are determined by the CODE switch 62 (FIG. 2A) in conjunction with the particular shift register element each switch 62 position is connected, and the clock frequency applied to the shift registers, as illustrated and to be described with reference to FIGS. 11 and 14.

(10) Beacon 30 (FIG. 1) Generation of Identification Pulse Code

Figure 11:
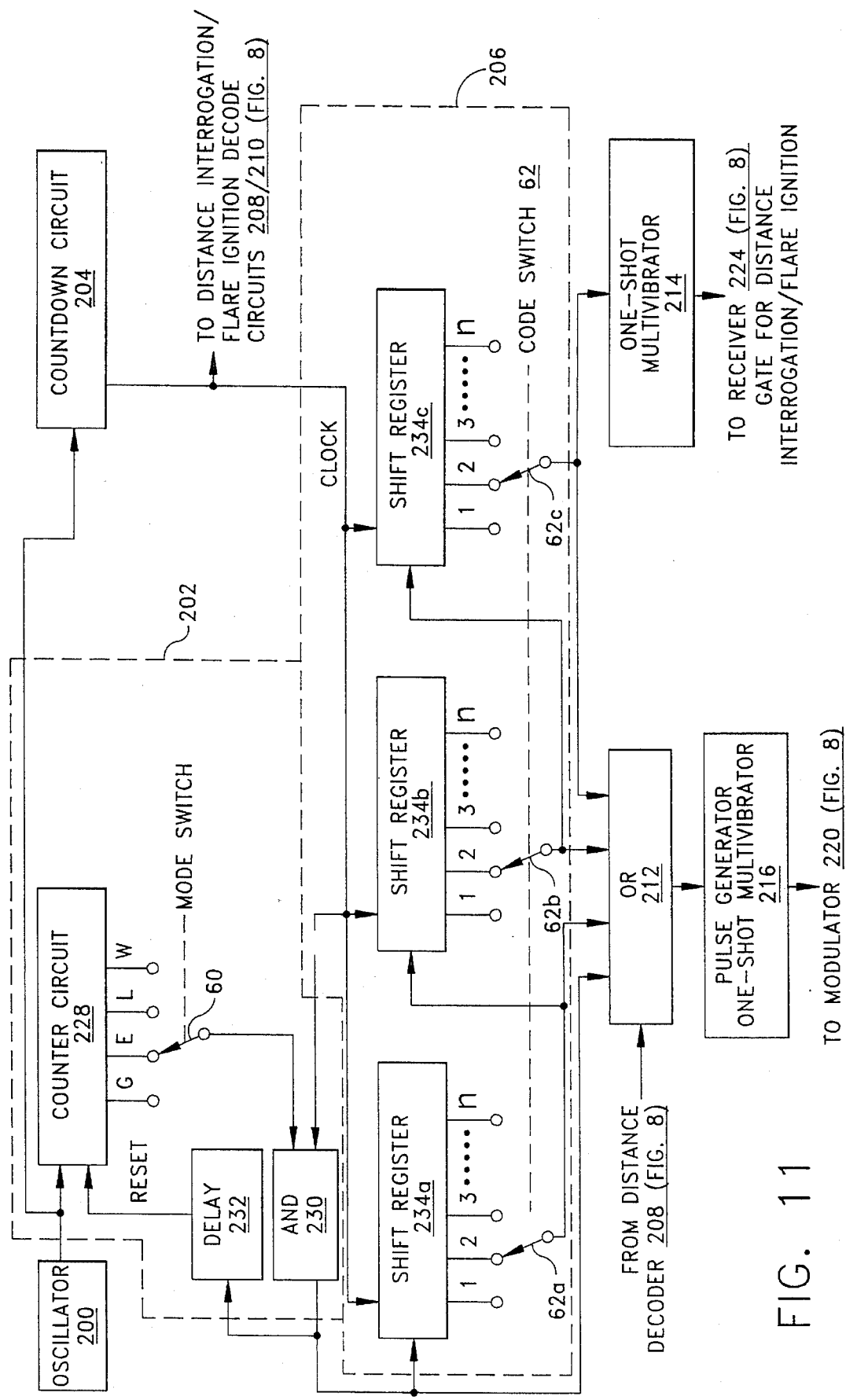
FIG. 11 is a block diagram of a marker beacon system for generating the MODE/CODE pulse train of FIG. 10.

FIG. 11 illustrates a means of generating the pulses used for beacon 30 identification. The means depicted correspond to the identification code groups of FIG. 10; i.e., four pulses in each group. The number of pulses is determined by the number of shift registers and ganged sections of the CODE switch 62 employed.

The MODE generator 202 is comprised of a counter circuit 228, the MODE switch 60, the AND-gate 230, and the delay circuit 232. When the counter circuit 228 has counted the number of oscillator ZOO pulses corresponding to its output taps (G, E, L, W), a positive voltage appears at those taps. With the MODE switch 60 set as shown and the voltage at the tap E becomes positive, a positive voltage appears at the AND-gate 230 input terminal connected to the switch 60 arm when the CLOCK output from the countdown circuit 204 also transitions to a positive voltage, the AND-gate 230 output transitions to a positive voltage. When the output from the AND-gate 230 is passed through the delay circuit 232 and introduced to the counter circuit 228 as a RESET input, the positive voltage at terminal E of the counter circuit 228 goes to zero. The output of AND-gate 230 is also connected to OR-gate 212 and thence to pulse generator 216. Pulse generator 216 is triggered by the leading edge of positive going inputs; therefore, a pulse is generated by the pulse generator 216. The leading edge of the pulse from pulse generator 216 corresponds to the leading edge of the pulse from AND-gate 230. That pulse from pulse generator 216 forms the first pulse of the identification code group depicted in FIG. 10. The basic time between pulse group onsets, Δt, for a given MODE is determined by the count level needed to generate the first pulse in a pulse group from the pulse generator 216.

The output of AND-gate 230 is also used as an input to the first shift register 234a of CODE generator 206. The positive pulse from And-gate 230 is entered into first shift register 234a upon a positive clock transition from countdown circuit 204. It should be noted that negative clock transitions correspond to positive transitions from counter circuit 228 to ensure entry of the AND-gate 230 positive pulse into first shift register 234a. The pulse entered into first shift register 134a is shifted through successive elements on the first shift register 234a with each positive transition of the CLOCK pulse from countdown circuit 204. When the pulse in the first shift register 234a is shifted into the shift register element corresponding to position 2 connected to first CODE switch arm 62a, a positive pulse appears on the first CODE switch arm 62a for one CLOCK period. The pulse on the first CODE switch arm 62a is passed through OR-gate 222 and is used to generate the second pulse in the identification code group by triggering the pulse generator 216. If three pulses are to comprise an identification code group, the output pulse derived from first shift register 234a is also fed to second shift register 234b where it is entered on the next positive CLOCK transition from countdown circuit 204. The output of second shift register 234b, via second CODE switch arm 62b, OR-gate 212, and pulse generator 216, forms the third pulse in the identification code group.

Similarly, a fourth pulse would be generated by third shift register 234c, and so on, if more shift registers were used to lengthen the identification code group.

The pulses emanating from the OR-gate 222 are not used directly as the input to the modulator 220, since the pulses from the OR-gate 212 would be orders of magnitude longer in duration than those desired or needed for detection and identification. Therefore, the pulses from the OR-gate 212 are first sent to pulse generator 216 which is a one-shot multivibrator.

The output from the last register, in this illustration the third shift register 234c and its switch arm 62c, is also connected to the one-shot multivibrator 214. A positive pulse triggers the multivibrator 214 to produce a positive gate voltage. As previously discussed in terms of the block diagram of FIG. 8, the gate output from one-shot multivibrator 214 is sent to activate receiver 224. The duration of the gate pulse corresponds to the length of time after the last pulse in each identification code group that the beacon 30 may expect to receive the distance interrogation and flare ignition codes from the navigating entity 32 (FIG. 1) or 34 (FIG. 1).

(11) An Alternative Means for MODE/CODE Selection

Figure 12:
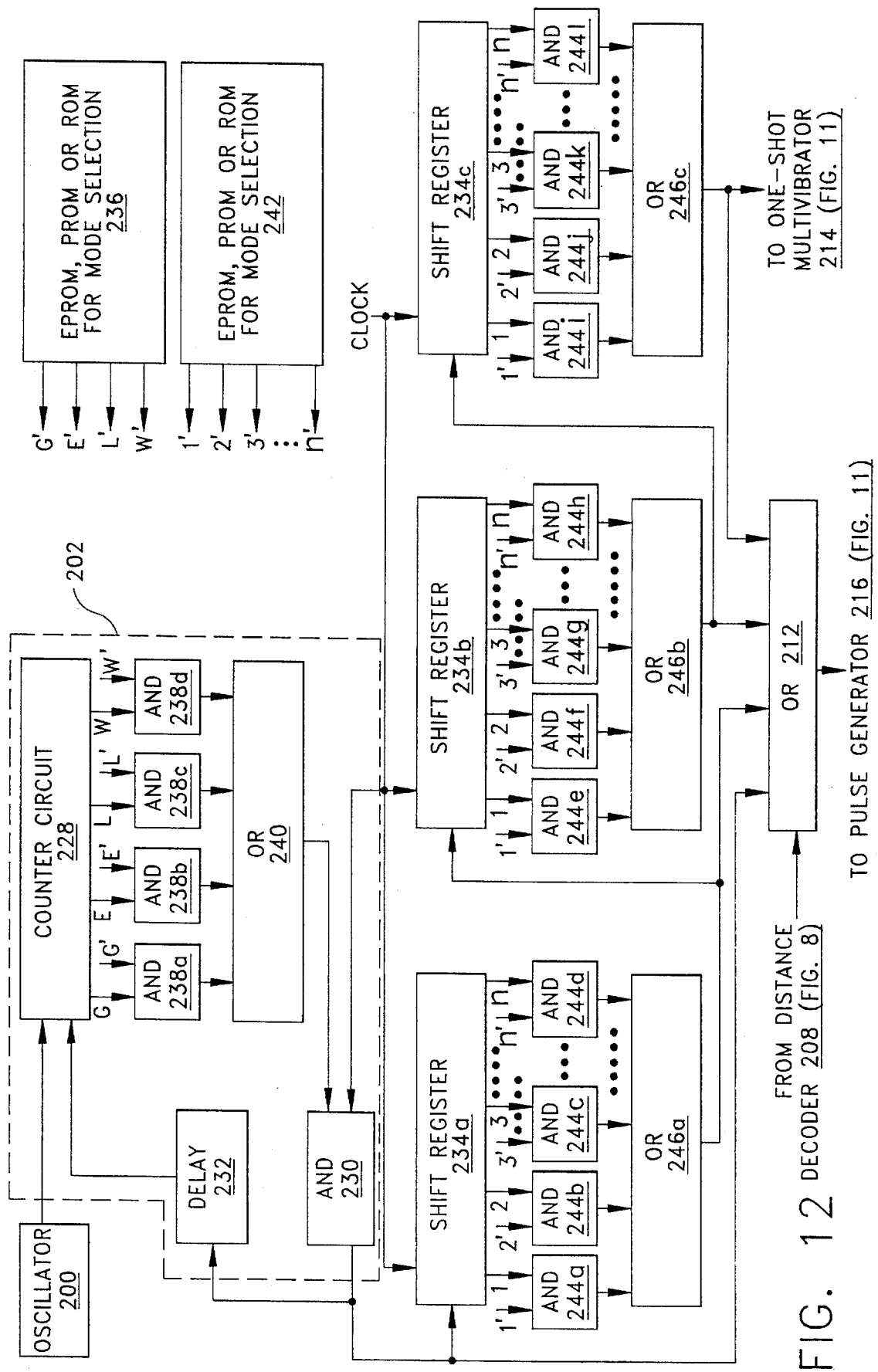
FIG. 12 is a block diagram of an alternate marker beacon system for generating the MODE/CODE pulse train of FIG. 10.

FIG. 12 depicts an alternative to the use of the mechanical switches 60 and 62 for the MODE and CODE selection as shown in FIG. 11. Either an erasable/programmable read-only-memory (EPROM), a programmable read-only-memory (PROM), or a read only memory (ROM) circuit 236 can be used in conjunction with the AND-gates 238a, 238b, 238c, and 238d, and the OR-gate 240. Components 236, 238a, 238b, 238c, 238d, and 240 in conjunction with each other replace the mechanical MODE switch 60 of FIG. 11. Selection of the MODE would be stored in component 236 so that upon application of beacon 30 power, a positive voltage appears only on the output terminal of component 236 which corresponds to the MODE selected. This allows the corresponding AND-gate 238a, 238b, 238c, or 238d to transition positively when the count level of the counter circuit 228 reaches the count for the selected MODE from component 236.

The outputs of the AND-gates 238a–d correspond to the inputs G, E, L, and W to MODE switch 60; the OR-gate 240 corresponds to the arm of MODE switch 60.

In similar fashion, EPROM, PROM, or ROM 242 in conjunction with AND-gates 244a, 244b, 244c, 244d, and OR-gate 246a replace the first CODE switch arm 62a; EPROM, PROM, or ROM in conjunction with AND-gates 244e, 244f, 244g, 244h, and OR-gate 246b replace the second CODE switch arm 62b; and EPROM, PROM, or ROM in conjunction with AND-gates 244i, 244j, 244k, 244l, and OR-gate 246c replace the third CODE switch arm 62c.

The use of an EPROM, PROM, or ROM in place of a mechanical switch enables a much larger beacon identification capability, as well as requiring less space in the beacon to perform the MODE and CODE functions. The EPROMs, PROMs or ROMs 236 and 242 can physically be one unit.

Figure 13A:
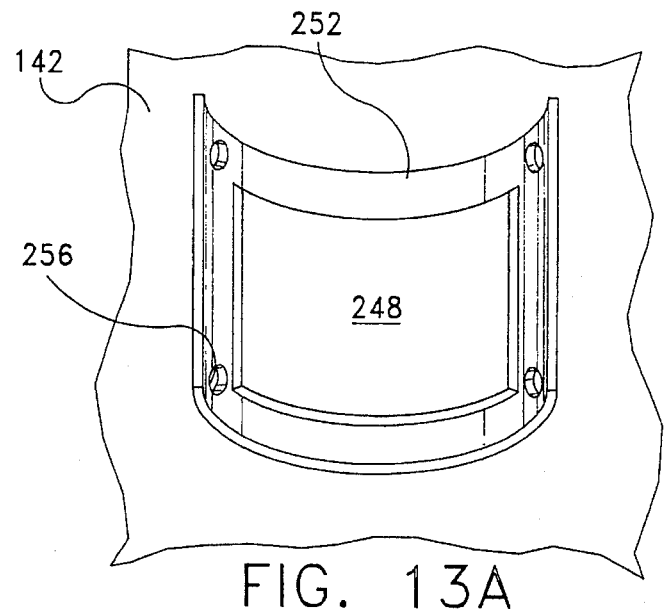
FIGS. 13A, 13B, and 13C show a modification of the marker beacon when using the alternate system of FIG. 12.
Figure 13B:
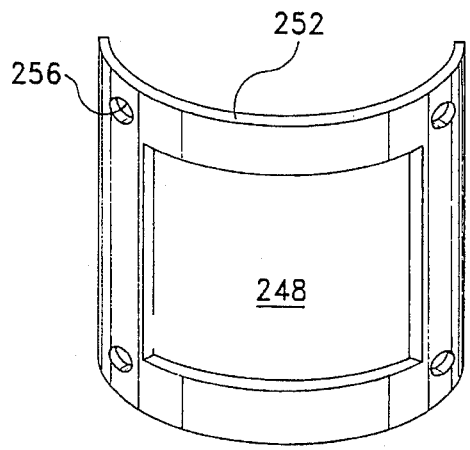
Figure 13C:
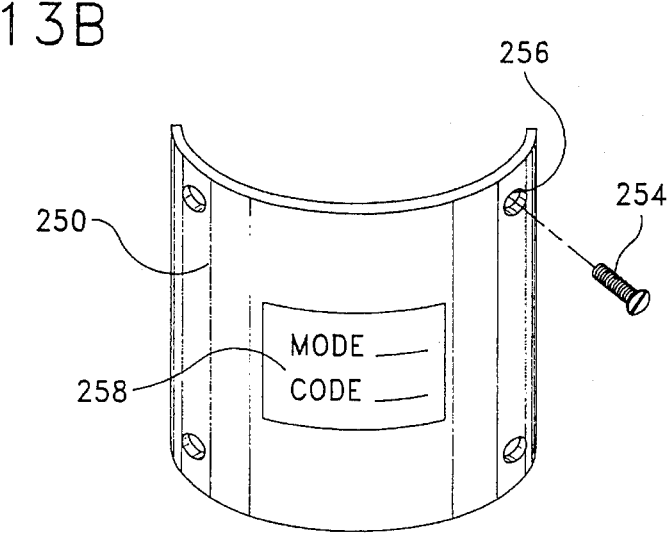

If this alternative is utilized, the outward configuration of the beacon 30 (FIG. 1) and 40 (FIG. 2) changes as well. Instead of the mechanical switches 60 and 62, shown in FIG. 2A, the configuration of FIGS. 13A, 13B, and 13C would be inserted. The EPROMs, PROMs, or ROMs 236 and 242 of FIG. 12 are accessed through access aperture 248 to make any operational change desired. The access aperture 248 would be covered operationally by a plate 250 after inserting gasket 252. The plate 250 is held in place by screws 254 threaded into apertures 256. Identification of the particular MODE and CODE stored in the EPROMs, PROMs, or ROMs 236 and 242 are inscribed on the decal 258. The inscription is used for verification of the MODE and CODE by both an issuer and user.

Figure 14:
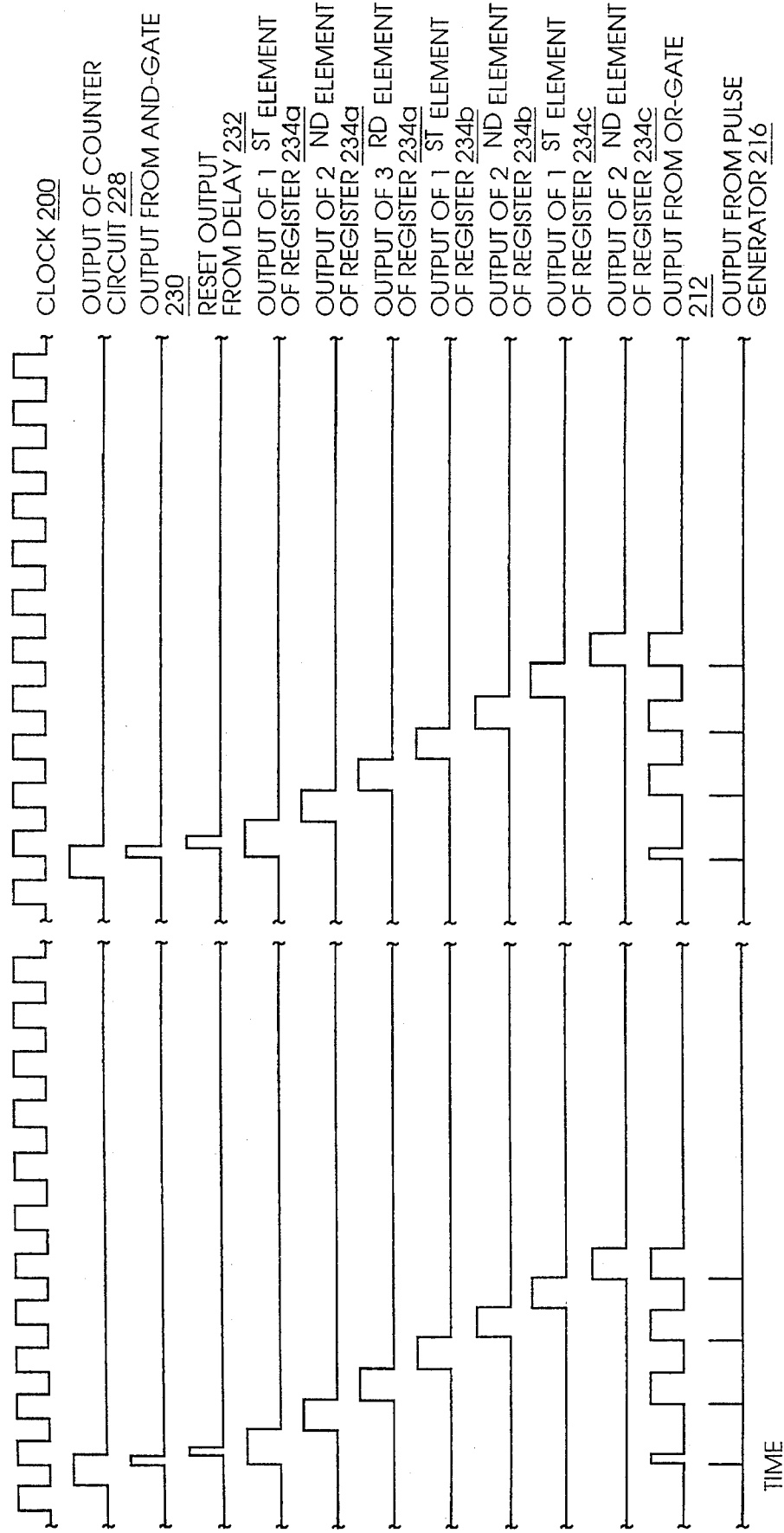
FIG. 14 is a diagrammatic view showing cause and effect sequences among pulse and trigger signal waveforms present in the operation of the elements in the binary systems of FIGS. 11 and 12 to generate the pulse code group of FIG. 10.

A representative set of binary system and trigger signal waveforms, to generate the sample identification code groups shown in FIG. 10, is depicted in FIG. 14. Either of the circuits illustrated in FIGS. 11 and 12 produces the representative waveforms.

(12) Airborne Platform Electronics, General

Figure 15A:
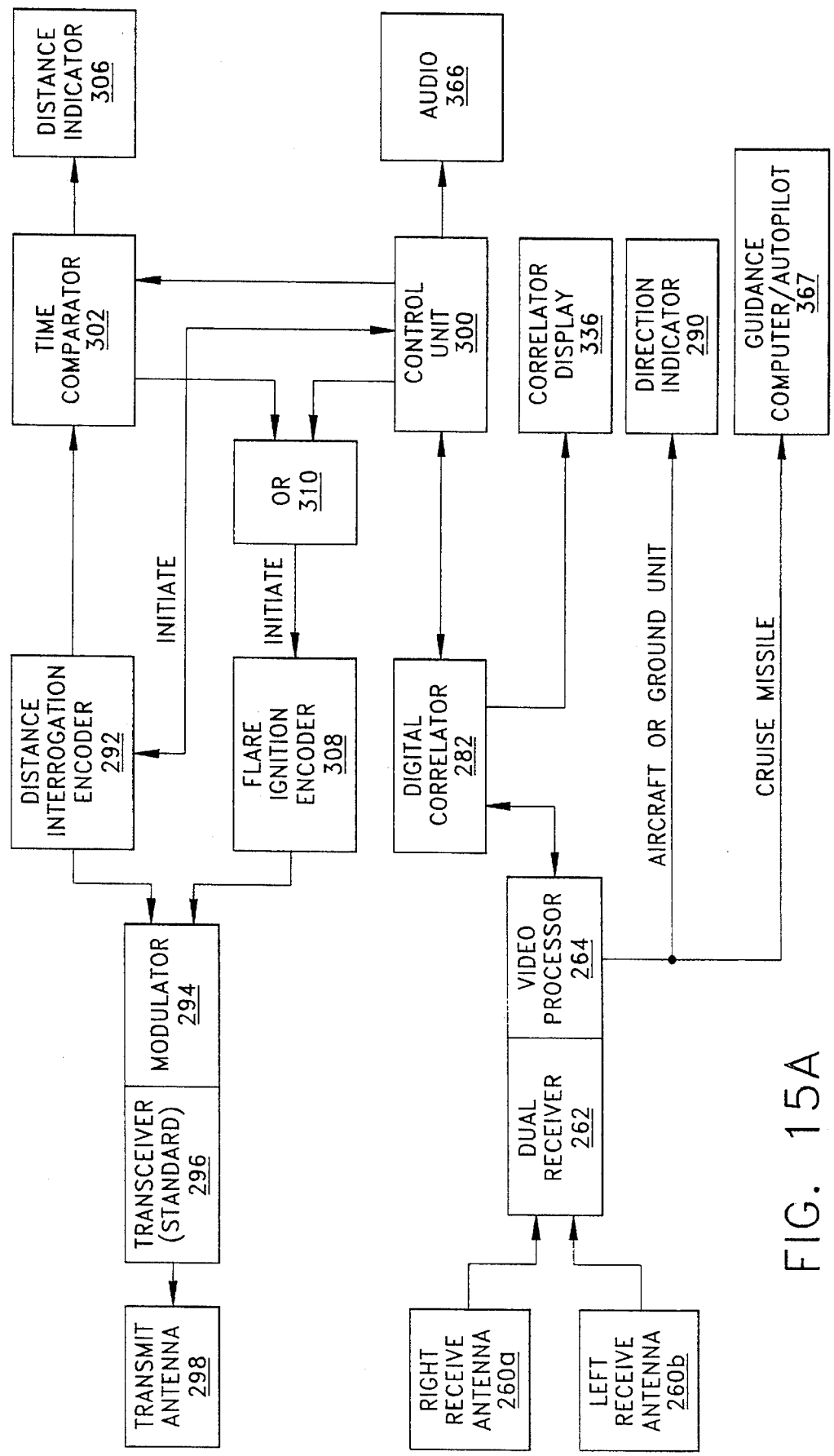
FIG. 15A is a block diagram of the aircraft electronics.

The overall block diagram of the airborne platform electronics is depicted in FIG. 15A. Two receive antennas 260a and 260b are mounted on the airborne platform 32 (FIG. 1) or 34 (FIG. 1). They are identified as the right receive antenna 260a and the left receive antenna 260b. Their particular type and shape are not germane; what is germane is that their receive gain centerlines are equally and oppositely skewed from the platform's centerline. (Refer to FIG. 16 for a general illustration of the two antenna receive pattern relationships, wherein δ is the skew angle between the antenna and platform centerlines.) Each receive antenna 260a and 260b is connected to a different one of two ports of a dual receiver 262 and video processor 264 combination.

Figure 15B:
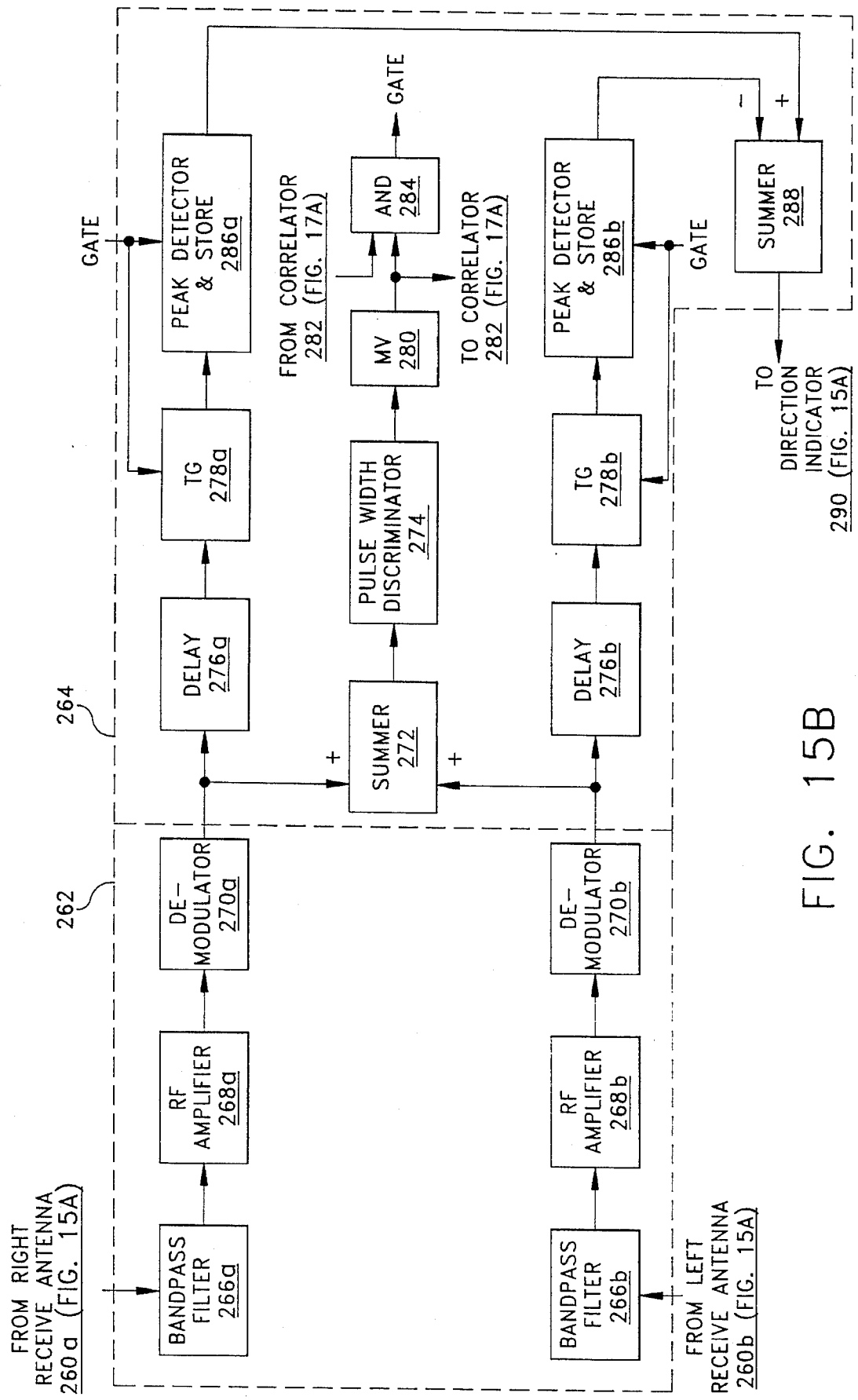
FIG. 15B is a block diagram of the dual receiver and video processor of FIG. 15A.

Refer now to FIG. 15B. In the dual receiver 262 the RF signal received from each receive antenna 260a and 260b is passed through a respective bandpass filter 266a or 266b, an RF amplifier 268a or 268b, and a demodulator 270a or 270b. The dual receiver 262 output associated with each antenna 260a and 260b is sent to the video processor 264.

In the video processor 264 the demodulated signals are summed in the summer 272 and checked for pulse width in the pulse width discriminator 274. At the same time the individual right and left signals are each respectively passed through a delay circuit 276a or 276b to a respective unity gain transmission gate (TG) circuit 278a or 278b. The signals within the pulse width criteria of discriminator 274 produce a trigger for one-shot multivibrator 280, whose output is fed to the correlator 282 (FIG. 15A) to determine if it meets the identification code criteria. The output from the one-shot multivibrator 280 is also fed to an AND-gate 284. The other input to the AND-gate 284 is from the correlator 282 and is present only if the pulse sent to correlator 282 is recognized as being part of the beacon's 30 (FIG. 1) identification code.

The output from the AND-gate 284 is in turn used as the gate signal to each of TG circuits 278a and 278b to pass the delayed signals and to the peak detector and store circuits 286a and 286b. These circuits sense the peak value of their input, update the stored value to the current value, and hold that value until the next gate pulse from the AND-gate 284 starts the process over. The stored output from the peak detection and store circuit 286a which is associated with the right antenna 260a is fed to the positive input of summer 288; while that associated with the left antenna 260b is fed to the negative input of the summer 288. The output from the summer 288 is the difference between its two inputs. The difference voltage is fed to the direction indicator 290 (FIG. 15A) located in a display for an aircraft 32 (FIG. 1) or a ground unit 36 (FIG. 1), or as an input to the autopilot 367 (FIG. 15A) if a cruise missile 34 (FIG. 1) is used.

If the output from the summer 288 is positive, the beacon 30 is to the right of the platform centerline. When the summer 288 output is negative, the beacon 30 is to the left of the platform centerline. A zero output from the summer 288 indicates that the beacon 30 is in line with the platform centerline. The magnitude of the output from the summer 288 is proportional to the angular offset between the centerline of the platform and the beacon's 30 location.

Refer again to FIG. 15A. When the correlator 282 recognizes the last pulse in the identification code group from beacon 30, it sends a trigger to the distance interrogation encoder 292, via control unit 300, to initiate generation of the distance interrogation code. Distance interrogation encoder 292 modulates the transmitted RF via modulator 294 which controls the transmission of the transceiver 296 from transmit antenna 298. The transceiver 296, the modulator 294, and the antenna 298 may be standard inventory items and need not be unique or dedicated to this application. Upon completion of the interrogation code, the distance interrogation encoder 292 sends a fiduciary pulse to the time comparator 302 and to the correlator 282, via control unit 300, where it is used to trigger a one-shot multivibrator 304 (FIG. 17A) within the correlator 282. The output from the one-shot multivibrator 304 is used as one of the gate signals allowing for the recognition of the beacon 30 response.

The response from the beacon 30 is processed in a manner similar to the identification code, producing a pulse from the correlator 282 when the proper response is received and recognized. The pulse from the correlator 282 is fed to the time comparator 302 via control unit 300. The time difference between the beginning of that pulse and the end of the fiduciary pulse is proportional to the slant range distance between the beacon 30 and the platform 32 or 34.

One means of achieving the distance is to apply the fiduciary pulse from the distance interrogation encoder 292 to an integrator as a reset pulse, following which the integrator would have a fixed voltage applied. The pulse from the correlator 282 indicating the proper response is received and recognized would be used as a HOLD command, stopping the integration process. At that time the voltage output from the integrator would be proportional to the distance between the platform 32 or 34 and the beacon 30.

A second means would be to initiate counting clock pulses at the time comparator 302 upon receipt of the fiduciary pulse from the distance interrogation encoder 292 at the end of the interrogation code that is sent to the beacon 30. Then stop the count with the pulse received at the time comparator 302 from the correlator 282 indicating the proper response is received and recognized from the beacon 30. The count level at that time would be representative of the slant range distance. This is displayed at the distance indicator 306 in the case of an aircraft 32.

Thus, the indication of distance displayed by the indicator 306 is updated each time the platform 32 receives and recognizes an identification pulse group and then receives a response to the platform's 32 interrogation code.

In the case where the navigating entity is an aircraft 32, initiation of the flare ignition code can be accomplished by entering a preset value of distance into the time comparator 302 via the control unit 300. When the time comparator 302 reaches the preset value, a trigger pulse is generated and sent to the flare ignition encoder 308 via the OR-gate 310. If the operator does not elect that option, the operator would initiate a trigger directly through the control unit 300 and the OR-gate 310. In the cruise missile 34 application, the OR-gate 310 is eliminated and the flare ignition encoder 308 trigger is derived from the time comparator 302 based on a preset value of time (distance). The output from the flare ignition encoder 308 is used to modulate the RF output of transceiver 296 via modulator 294.

The correlator display 336 and audio 366 are explained later with reference to FIG. 17B.

(13) Correlator 282

The correlator 282 portion of the navigating entity's electronics is based upon a technique that determines the presence of periodicies in a train of pulses, where the pulse train is based upon the onset of a so-called "epoch" periodic phenomenon from which the pulse is generated. The epoch can be represented by a signal exceeding an amplitude threshold, a rate of change, an acceleration, or combinations thereof. Pulses with a periodic relationship do not have to be contiguous, but can have other pulses occurring between them. Therefore, the correlator can be used in a very low signal to noise ratio environment and still selectively provide indications of particular time spacings between the epochs. The basic process is described in U.S. Pat. No. 3,495,077, Apparatus for Determining the Time Interval Correlation of the Occurrence of Pulses, by F. F. Hiltz and C. T. Pardoe, issued on 10 Feb. 1970. The concept has been successfully employed to detect and extract periodic epochs, in real time, from highly contaminated waveforms when other techniques failed.

The following is a description of the processing, tailored for the correlator application of the present inventions. It should be noted that advances in electronics since issue of the cited patent allow enhanced correlator output displays, and orders of magnitude of increased processing in a given sized package.

Refer now to the block diagram of FIG. 17a for a description of the correlator 282. The output from the one-shot multivibrator 280 in the video processor 264 (FIG. 15B) is fed to two AND-gates 312 and 314 in correlator 282. A second input to AND-gate 314 is one of the outputs, CLOCK' from the clock generator 316. The AND-gate 314 is used to synchronize the pulse from the one-shot multivibrator gate 280 with the CLOCK' signal. A third input to AND-gate 314 is the output of the one-shot multivibrator 304 which is triggered by the termination of the distance interrogation code output from the distance interrogation encoder 292 (FIG. 15A) at the same time that the encoder 292 initiates the time comparator 302 (FIG. 15A). The duration of the pulse from the one-shot multivibrator 304 extends through the maximum time to receive a beacon 30 (FIG. 1) response to the distance interrogation. The output from the AND-gate 314 is introduced into the beacon response code recognition circuit 318. Its operation is essentially the same as that portion of the correlator 282 used for the beacon code identification; and, therefore, will not be elaborated upon. It should be noted, however, that the CLOCK' pulse repetition rate may be higher than that of clock generator 316 output, CLOCK; dependent upon the spacing of pulses in the beacon 30 response. The output from the beacon response code recognition circuit 318, that could be called the distance code recognition circuit, is sent to the time comparator circuit 302. An output pulse from the recognition circuit 318 indicates that a valid response to distance interrogation has been received from the beacon 30. The pulse causes the time comparator 302, that measures distance, to hold its value until it is triggered again by the distance interrogation encoder 292.

Assume a pulse representing an epoch pulse from the one-shot multivibrator 280 is input to the AND-gate 312, which has a second input, CLOCK, from the clock generator 316. The purpose of the AND-gate 312 is to synchronize the input pulse from the multivibrator 280 with the CLOCK, in order to allow the further time synchronized processing. The output from the AND-gate 312 is applied to a serial shift register 320a, and is entered into the register 320a by a positive CLOCK transition. The pulse in the register 320a is shifted sequentially to each of the register's 320a elements upon each positive transition of the CLOCK. FIG. 14 depicts a representation of the synchronization of an input pulse with the CLOCK, and the subsequent shifting through the shift register. With a CLOCK period of $\Delta t_c$, a pulse in the register 320a at the output of the $k^{th}$ element means that an elapsed time of $k\Delta t_c$ has transpired since the pulse was originally entered into the register 320a. The output from the last element in shift register 320a is similarly shifted into register 320b, and so on through registers 320c and 320d for the number of MODES described. Transmission gates (TGs) 322a, 322b, 322c, and 322d are connected to the last elements of registers 320a, 320b, 320c, and 320d, respectively. The operator selects the particular MODE of interest, via the control unit 300 (FIG. 15A), in order to produce a gate signal $m_j$ for application to the TG associated with the selected MODE; j=G, E, L, or W. The output of the TG associated with the selected gate $m_j$ will then be all pulses with a minimum delay of $\Delta t_j - (\Delta t^1 + \Delta t^2 + \Delta t^3)_{max}$; where (in terms of the four MODES j=G, E, L, or W) $\Delta t_j - (\Delta t^1 + \Delta t^2 + \Delta t^3)_{max}$ is the minimum value possible for all n-CODES. The pulse train introduced into shift register 324, via OR-gate 326, will then originate only from the output of the TG selected by $m_j$. Note that here and in the following, $\Delta t_j$ corresponds to the $\Delta t$ of FIG. 10.

Register 324 has outputs from each element corresponding to a time coincidence of each pulse in two contiguous pulse groups for all n-codes of interest. Each of those outputs is connected to a corresponding one of a set of AND-gates 328a, 328b ... 328c ... 328d, as shown. The other input to each of those AND-gates is the reference pulse from the AND-gate 312.

With n-CODES for each selected MODE, with the codes identical for each particular value of n, and with N' pulses in each pulse group, the number of shift register outputs, K, from register 324 needed to observe the coincidence between each pulse within a pulse group with each pulse in a preceding group is given by $$K=[(N')^2-N'+1] \cdot n$$

if the intragroup pulse spacings are not equal; and $$K=(2N'-1) \cdot n$$

when the spacings are equal. For example, referring to FIG. 10 and assuming equal intragroup pulse spacings, K=7n.

If the number of possible CODES is 10, the value of K would be 70. The number of shift register elements would be determined by the desired resolution (intragroup pulse spacings for all n-CODES and the CLOCK period $\Delta t_c$) and the difference between the minimum and maximum times between pulses in two contiguous pulse groups. Again referring to FIG. 10, and assuming equal intragroup pulse spacings, that difference would be $$(\Delta t_j + 3\Delta t'_n) - (\Delta t_j - 3\Delta t'_n) = 6\Delta t'_n$$

Let $m_{i,n}$ signify the individual outputs of the register 324 for all possible n-CODES, and where i=1, 2, 3 ... N'. Then the individual values of $m_{i,n}$ for that case would be:

$$m_{1,n} = \Delta t_j - 3\Delta t'_n$$

$$m_{2,n} = \Delta t_j - 2\Delta t'_n$$

$$m_{3,n} = \Delta t_j - \Delta t'_n$$

$$m_{4,n} = \Delta t_j$$

$m_{5,n} = \Delta t_j + \Delta t'_n$ $m_{6,n} = \Delta t_j + 2\Delta t'_n$ $m_{7,n} = \Delta t_j + 3\Delta t'_n$ Thus for example, the output from AND-gate 328b indicates a time separation between the reference pulse from gate 312 and a previous input pulse to the correlator 282 of an amount $\Delta t_j - 2\Delta t'_n$. The output of the AND-gate 328c corresponds to the time separation $\Delta t_j$ when the delay prior to register 324 is selected to be the minimum for the $m_j$ selected.

Each gate 328a, 328b ... 328c ... 328d has its output connected to a respective counter 330a, 330b ... 330c ... 330d; each counter totaling the number, $\Sigma_{i,n}$, of associated coincidences in a time T. The counters then connect to respective digital to analog (D/A) converters 332a, 332b .. . 332c ... 332d which convert the digital count level to an analog voltage. The outputs from the D/A converters 332a, 332b ... 332c ... 332d are sequentially sampled in the multiplexer 334, whose output is fed to the vertical amplifier section of the correlator display 336, as shown in FIG. 17B. A representative display is depicted in FIG. 18 for the example given above (4 pulses in a group, with equal intragroup pulse spacing.

In addition to feeding the pulses indicating coincidence of two pulses separated by a given time to the counters 330a, 330b ... 330c ... 330d, the outputs from the AND-gates 328a, 328b ... 328d are also connected to their respective TGs 338a, 338b ... 338d. The operator, in addition to selecting $m_j$ for the MODE of interest, also selects the CODE of interest; the selection determining which particular $m_{i,n}$ is positive. A positive value of $m_{i,n}$ allows it to gate its associated TG 338a, 338b ... 338d. The TG, to which its gate signal $m_{i,n}$ is positive, will pass all of its input pulses, via OR-gate 340, to trigger the one-shot multivibrator 342. The output from the multivibrator 342 is fed to the AND-gate 284 in the video processor 264 (FIG. 15B) to allow processing of the received signal in terms of the direction of the beacon 30 (FIG. 1) from the centerline of the right and left receive antennas 260a and 260b (FIG. 15A).

The output of AND-gate 328c, corresponding to $\Delta t_j$, is not fed back to AND-gate 284; since pulses from it are already incorporated in the other pulses triggering the one-shot multivibrator 342, and also because there may be other beacons in the area employing the same MODE. Passing pulses back due to other beacons using the same MODE would produce erratic and false direction indications. It is assumed that there will be only one beacon within a given detection area which has the same MODE-CODE. However, the output from AND-gate 328c is counted, with its count level displayed as an aid to the operator in detection and identification as discussed in the following.

(14) Correlator Multiplexer 334

Figure 17B:
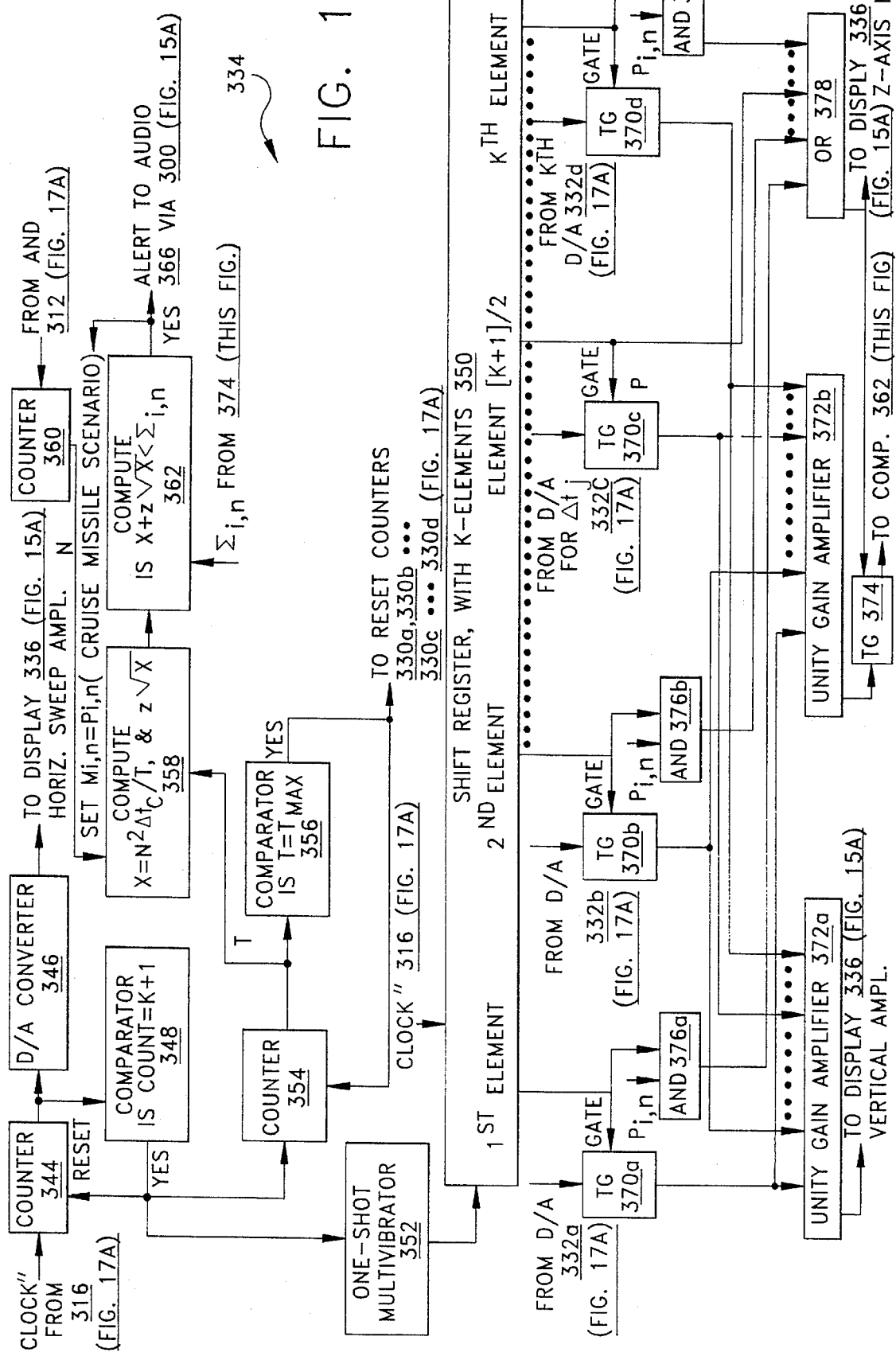
FIG. 17B is a block diagram of the correlator's multiplexer.
Figure 18:
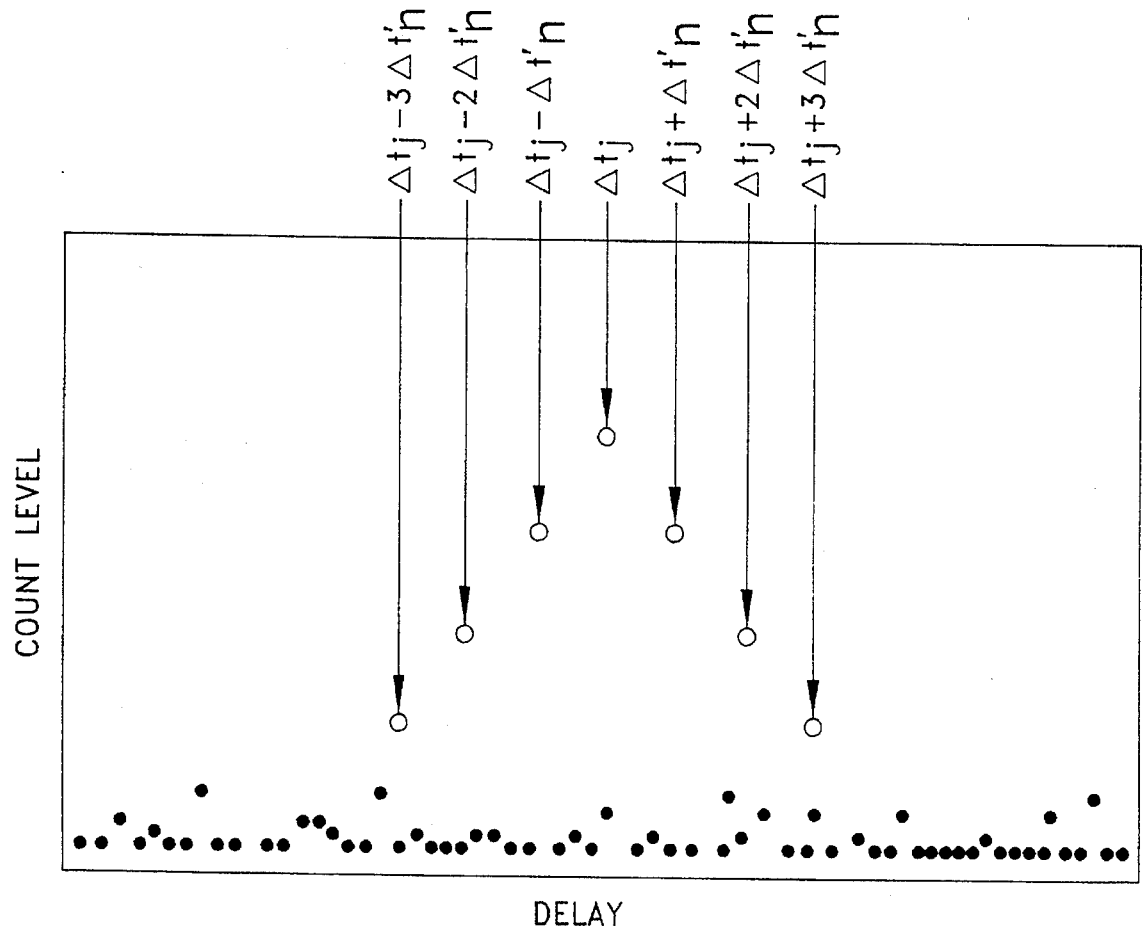
FIG. 18 is a representation of a correlator display (e.g., cathode ray tube)

The correlator multiplexer 334 and its associated circuitry is depicted in FIG. 17B. A third output from the CLOCK generator 316 (FIG 17A), CLOCK", is fed to a digital counter 344. The output from the digital counter 344 is fed to a D/A converter 346; whose output is stair-stepped upwards in voltage, and is in turn fed to the horizontal sweep amplifier in the correlator display 336 (FIG. 15A). The digital counter 344 output is also fed to a digital comparator 348. There, the count level is compared to a preset value, K+1; where K is the number of elements in shift register 350 and has a value determined by the conditions previously cited with respect to the correlator 282 (FIG 17A). When the count level reaches the value K+1, a pulse is generated and fed to the digital counter 344 to RESET the counter to zero. The pulse is also used as a trigger for the one-shot multivibrator 352, whose output is entered into shift register 350 at the next positive transition of CLOCK". The output pulse from the comparator 348 is additionally fed to a counter 354, whose count level is indicative of a time T. The time T is compared to a $T_{max}$ in a comparator 356. When $T=T_{max}$, a RESET pulse is generated to reset counter 354 to zero. The value of the $T_{max}$ is preset, and is determined on the basis of the maximum count level to be displayed by the correlator display 336 before the display count is restarted. Simultaneously, T is input to the compute circuit 358.

The compute circuit 358 has two variables introduced to perform its calculations, T and N. The value of N is derived from the counter 360, and represents the number of pulses introduced into the correlator 282 (FIG. 17A) via AND-gate 312 (FIG. 17A). If the pulses emanating from the AND-gate 312 are random in nature, then the probability of coincidence between pulses separated by a time $t+\Delta t_c$ is given by $X'=X+z\sqrt{X}$; where $X=N^2\Delta t_c/T$, $\sqrt{X}$ is the sigma value, and z is determined a priori and based upon the user's acceptance of a false alarm rate determined by z. That is, when the comparator 362 determines that X' is less than $\Sigma_{i,n}$, the value of the output from TG 374, and produces a "yes" output, it signifies that the particular value of $\Sigma_{i,n}$ represents a periodic spacing of pulses corresponding to the spacing between pulses from the shift register 324 (FIG. 17A) represented by $m_{i,n}$, and with a confidence level determined by $z\sqrt{R}$. In the case of a manned aircraft, the output from the comparator 362 is used to trigger an audio signal in the audio circuit 366 (FIG. 15A), via the control unit 300 (FIG. 15A), to alert the operator that the identification code of interest is being received in the event he has not visually so determined by observation of the correlator display 336. Upon determination that the identification code of interest is being received, the operator will set $p_{i,n}$ to $m_{i,n}$ in order that the appropriate pulses will be fed back to the video processor 264 (FIGS. 15A and 15B) from the one-shot multivibrator 342 (FIG. 17A) in the correlator 282 (FIG. 17A). The gate controls in the multiplexer 334 are initially set by the operator for the particular MODE-CODE of interest. In the case of cruise missile application, $m_{i,n}=p_{i,n}$ is set only after it has been determined that $X'<\Sigma_{i,n}$ prevents false direction steering commands to be sent to the guidance computer/autopilot 367 (FIG. 15A) from the video processor 264 (FIGS. 15A and 15B).

The pulse entered into the shift register 350 from the one-shot multivibrator 352 is sequentially shifted through the shift register 350 by the CLOCK". As the pulse reaches each of the K-elements, a gate signal is applied to TG's 370a, 370b ... 370c ... 370d, allowing the outputs from the correlator's D/A converters 332a, 332b ... 332c ... 332d to be sequentially connected to the unity gain amplifier 372a and then to the correlator video display 336. Similarly, the D/A converters 332a, 332b ... 332d outputs are fed to unity gain amplifier 372b.

The output of D/A converter 332c through TG 370c could be fed to unity gain amplifier 372b only when operational criteria dictate that only one beacon 30 (FIG. 1) is in the detection range for a particular MODE. If such a scenario exists, then unity gain amplifier 372a can be eliminated and amplifier 372b would feed the vertical display as well as TG 374.

In addition to gating the TG's 370a, 370b ... 370c ... 370d, each element of shift register 350 is applied to a corresponding AND-gate 376a, 376b ... 376c along with the operator selection of the $p_{i,n}$ of interest. The AND-gates 376a, 376b . . . 376c are input to the OR-gate 378. The output from the shift register 350 that corresponds to $\Delta t_j$ does not require ANDing and is fed directly to the OR-gate 378. The output from OR-gate 378 is sent to TG 374 to selectively gate the output from unity gain amplifier 372b for the comparison of $\Sigma_{i,n}$ with X' in the comparator 362. The output from OR-gate 378 is also sent to the Z-axis modulator of the correlator display 336 to intensify the count level indication corresponding to the $P_{i,n}$ of interest. This is a visual aid to the operator, in addition to the audio alert, to determine setting $m_{m,n}$.

FIG. 18 depicts a representative correlator display, where N' is four and the intragroup pulse spacings are equal. In FIG. 18 the count levels indicated by a o are those corresponding to the selected $P_{i,n}$, and are more intensely illuminated in the display than the others.

When the navigating entity is an unmanned vehicle, e.g. cruise missile 34 (FIG. 1), there will not be a requirement for a display 336 (FIG. 15A). Therefore, all processing associated only with a display would be deleted for this application. In addition, the output indicated as an ALERT to the audio 366 would be used to automatically set $m_{i,n}$ to $P_{i,n}$ through the instrumentality of suitable, well known, electronic circuitry. After passing each destination (waypoint), the $m_{i,n}$ for that point would be negated and $P_{i,n}$ would be reset to the code associated with the next destination (waypoint or target).

(15) Ground Backpack Unit 36 (FIG. 1)

The application of ground unit 36, depicted in FIG. 1, involves two distinct types of scenarios comprising (i) aiding ground forces to navigate beacon 30 (FIG. 1), and (ii) verifying beacon operation after its deployment. A block diagram level depiction of ground unit 36 is provided in FIG. 19A. As in the unmanned application, there is no requirement for a correlator display.

Operation begins with the operator entering the particular MODE-CODE information in the CODE selector 380; the CODE selector 380 being located in the add-on unit 382 to a standard backpack 384 comprised of a communication antenna 386, a transceiver 388, an audio amplifier 390, handset speaker or headphones 392, and a battery 394. The MODE-CODE gate information, $M_j$ and $m_{i,n}$, is transferred from the CODE selector 380 to the digital correlator 396.

Prior to use, a hand-held direction finding (D/F) antenna 398 is self-stored. The hand-held antenna 398 becomes operable by pulling the inner tube 404 out of the handle 402, unfolding the element supports 406 and the antenna elements 408, and securing them in the position shown.

Figure 16:
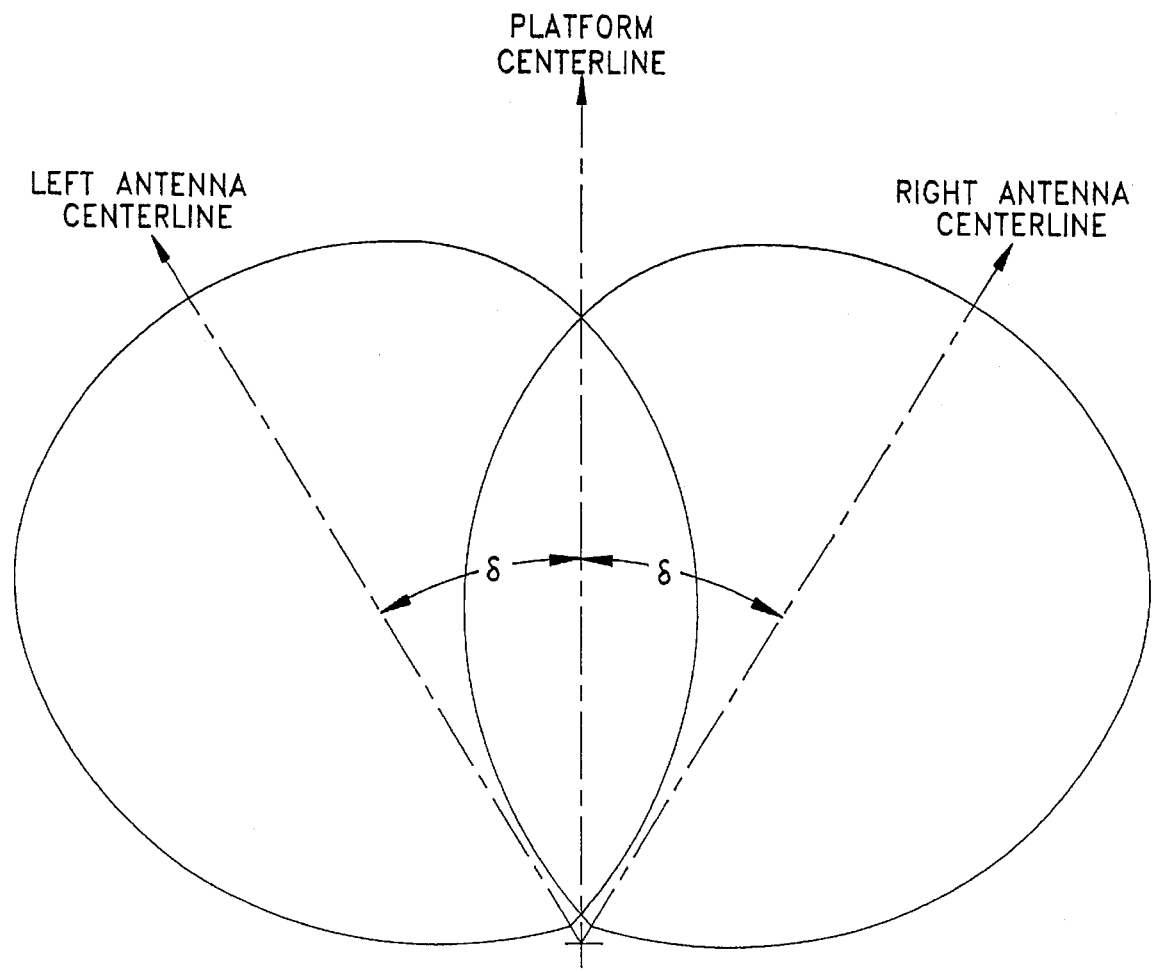
FIG. 16 shows representative aircraft receive antenna patterns.

In operation, the operator slowly pans the direction finding (D/F) antenna pair 410a, 410b until reception of the MODE-CODE of interest is indicated by either or both the needle on the D/F indicator 412, or the audio in the handset speaker or headphones 392. At this time the antenna pair 410a, 410b is slowly and incrementally moved until a null is obtained in the D/F indicator 412; thus giving the direction to the beacon 30. The receive pattern for the antenna pair 410a, 410b is essentially as depicted in FIG. 16.

Assume that the beacon 30 identification code of interest has been determined and that the antenna pair 410a, 410b are held in the general direction of the beacon 30. The RF signal is passed to the RF receiver 414 and then to the video processor 416. The RF receiver 414 and video processor 416 are depicted in block diagram form in FIG. 19B in more detail. Instead of a dual receiver as in the air borne unit, a single receiver 414 is used along with a first coax switch 418. The first coax switch 418 is alternately connected to the right and left antennas 410a, 410b. The output of the first coax switch 418 is fed to a bandpass filter 266a and then to an RF amplifier 268a. The RF amplifier 268a feeds the demodulator 270a. The demodulator 270a output is fed to a pulse width discriminator 274 and to a second coax switch 420. Second coax switch 420 is in synchronism with first coax switch 418 such that the signal entered into the delay 276a represents that from the right antenna 410a and that entered into the delay 276b represents the signal from the left antenna 410b. Therefore, the two coax switches 418 and 420 allow one RF channel to perform the functions of the dual channels depicted in FIG. 15B. The reduction of one RF channel is possible in this case due to the relaxed short term direction finding requirement because of the difference in closing velocity of the airborne compared to the ground unit. Note however, that the blocks having the same numerical notation in FIGS. 15B and 19B infer that the equipment of those blocks are substantially the same, at least functionally if not physically.

From the delay circuits 276a, 276b the processing is the same as for the airborne configurations. The direction from the centerline of the antennas 410a, 410b, to the beacon 30 is given by the D/F indicator 412 mounted in the handle 402 for the antennas 410a, 410b.

The output from the pulse width discriminator 274 is sent to the one-shot multivibrator. The output from the one-shot multivibrator 280 is sent to the ground unit's correlator 396 to determine if the desired MODE-CODE is being received. Upon identification that the desired signal is being received, the correlator sends a pulse back to the processor's AND-gate 284, as in the case of the airborne unit. AND-gate 284 generates a gate pulse which is fed to TG's 278a, 278b as well as to the two peak detector and store circuits 286a, 286b. As before, the difference in amplitude between the outputs from the two peak detection and store circuits is determined by the summer 288; and the amplitude difference is fed to the D/F indicator 412, where the indicator furnishes relative bearing information to the operator.

The two coax (or lobe) switches 418, 420 are driven (switched) from position 1 to position 2 by a switch driver 422. As shown in FIG. 19C the frequency of switching is determined by the frequency of an oscillator 424 which controls the flip-flop (bi-stable) multivibrator 426, and which in turn controls the switch driver 422.

Figure 19A:
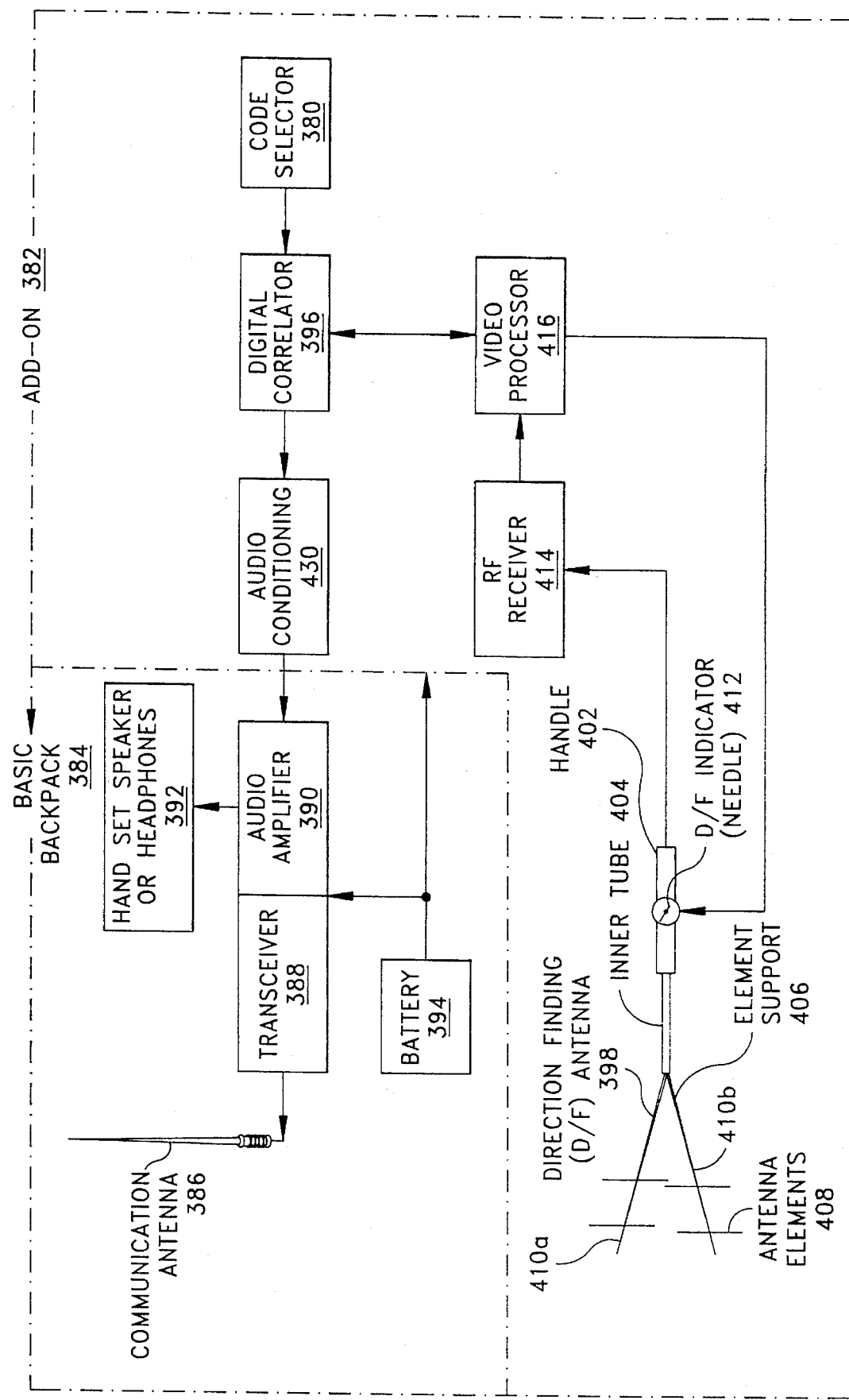
FIG. 19A is a combination block diagram and selected components pictorial representation of the ground backpack unit of FIG. 1.
Figures 19B, 19C:
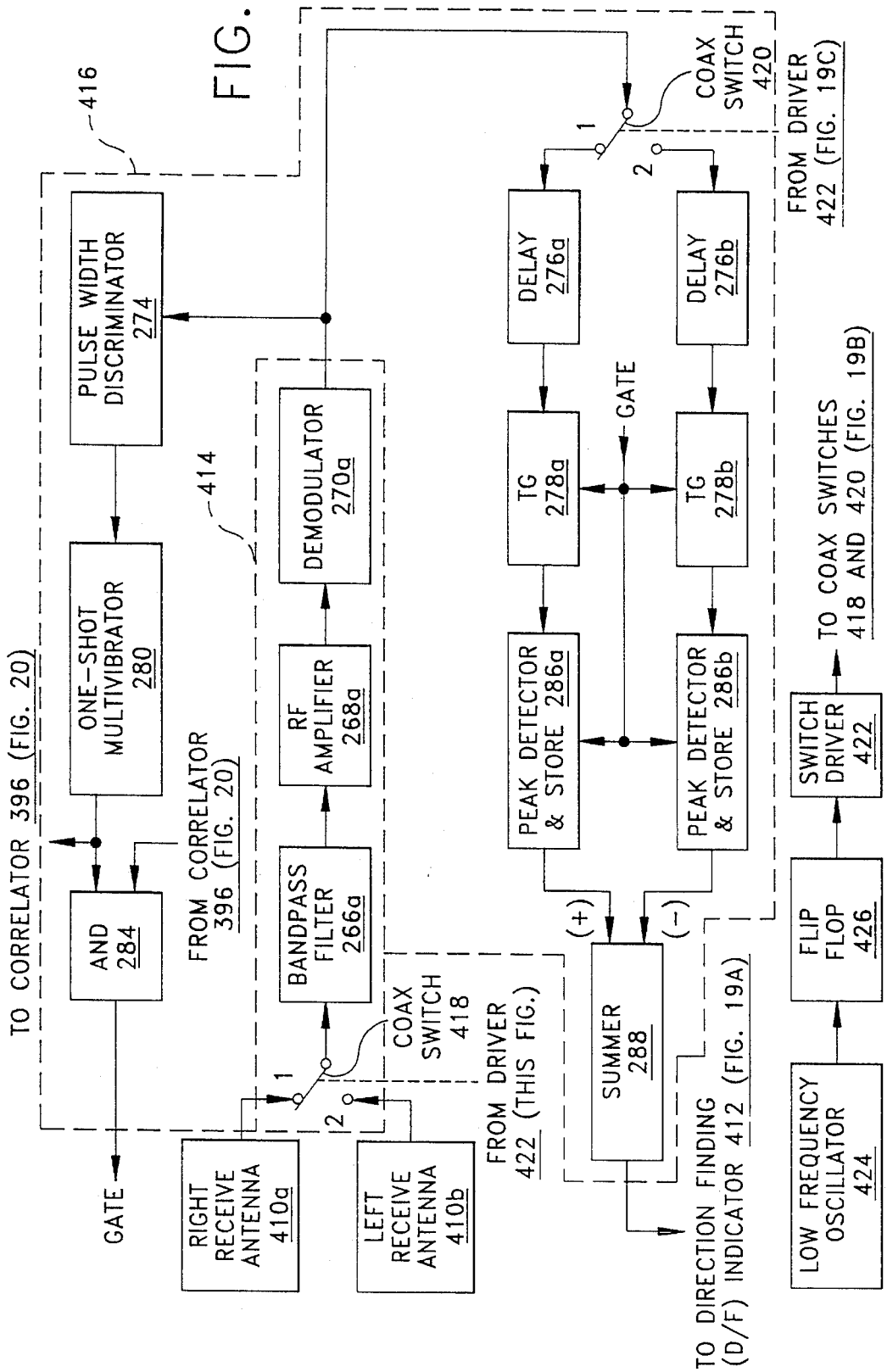
FIG. 19B is a more detailed block diagram of the add-on unit of the ground backpack unit of FIG. 19A.
FIG. 19C is a block diagram of the switching mechanism within the add-on unit of FIG. 19B.
Figure 20:
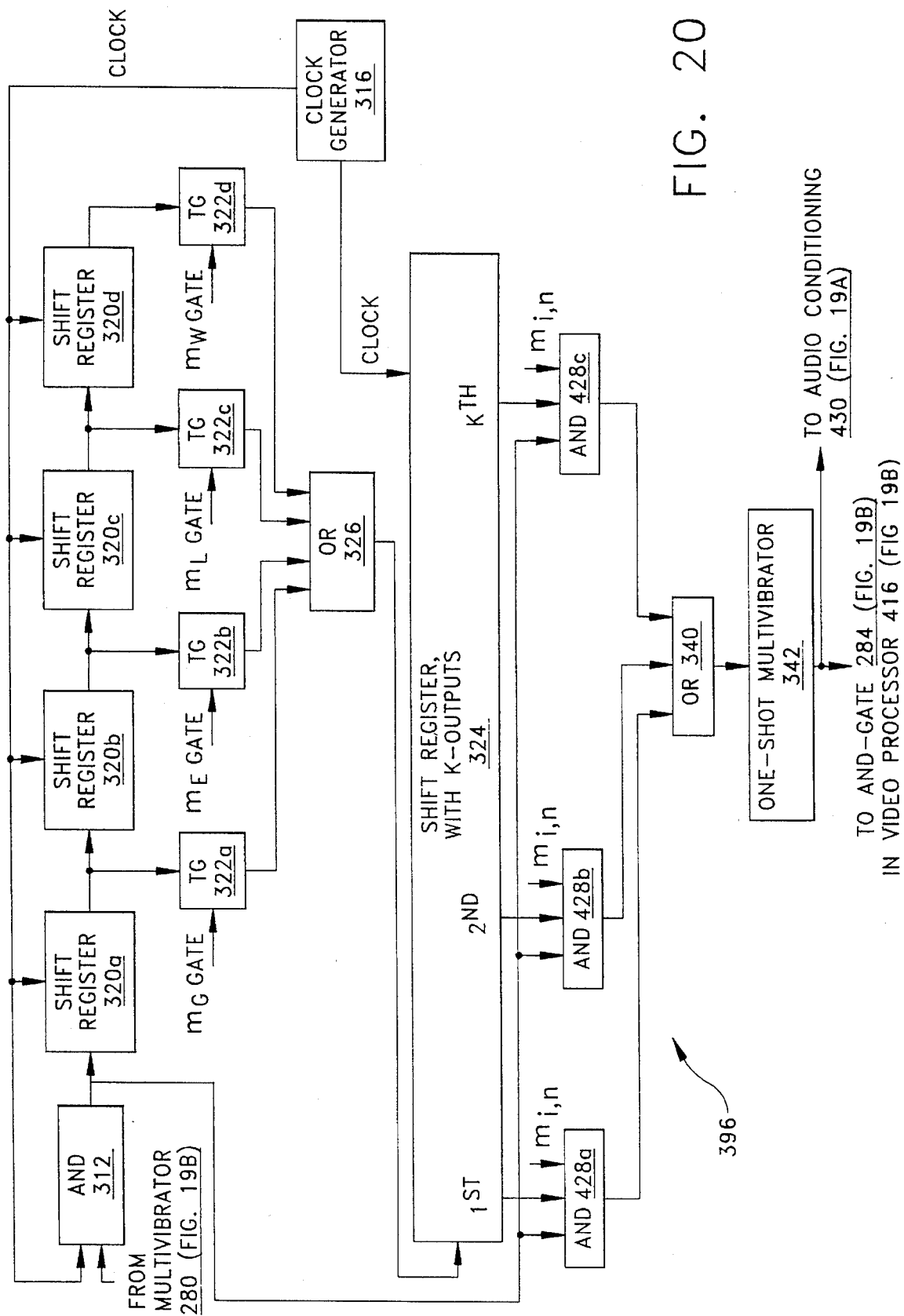
FIG. 20 is a block diagram of the correlator of the ground backpack unit of FIG. 19A.

Referring to FIG. 20, showing a block diagram of the ground unit digital correlator 396 of FIG. 19A, it may be noted that from the input to AND-gate 312 through to the input to shift register 324 the circuit is the same as that for FIG. 17A with components carrying the same numerical and letter notation. The system differs with the outputs from the shift register 324 being fed to AND-gates 428a, 428b . . . 428c. Another input to AND-gates 428a, 428b . . . 428c is the output from AND-gate 312, containing the reference pulse, as in FIG. 17a, and a third input is from the gates $m_{i,n}$. The gates $m_{i,n}$ are selected for the particular code to be identified. All of the AND-gate 428a, 428b . . . 428c outputs representing the 1st through the $k^{th}$ shift register 324 output are sent to the OR-gate 340. The output from the OR-gate 342 triggers the one-shot multivibrator 342 whenever a coincidence occurs. The output from the multivibrator 342 is sent to the video processor 416 indicating that a signal pulse from the beacon 30 (FIG. 1) is present and to use that pulse for direction finding purposes. The multivibrator 342 also feeds the audio conditioning circuit 430 to generate a tone which is fed to the audio amplifier section 390 in the backpack add-on 382 (FIG. 19A). The operator can then use the handset speaker or headphones 392 to verify that the beacon 30 signal is being received.

(16) Beacon Water Deployment (FIGS. 21A–D)

Figure 21A:
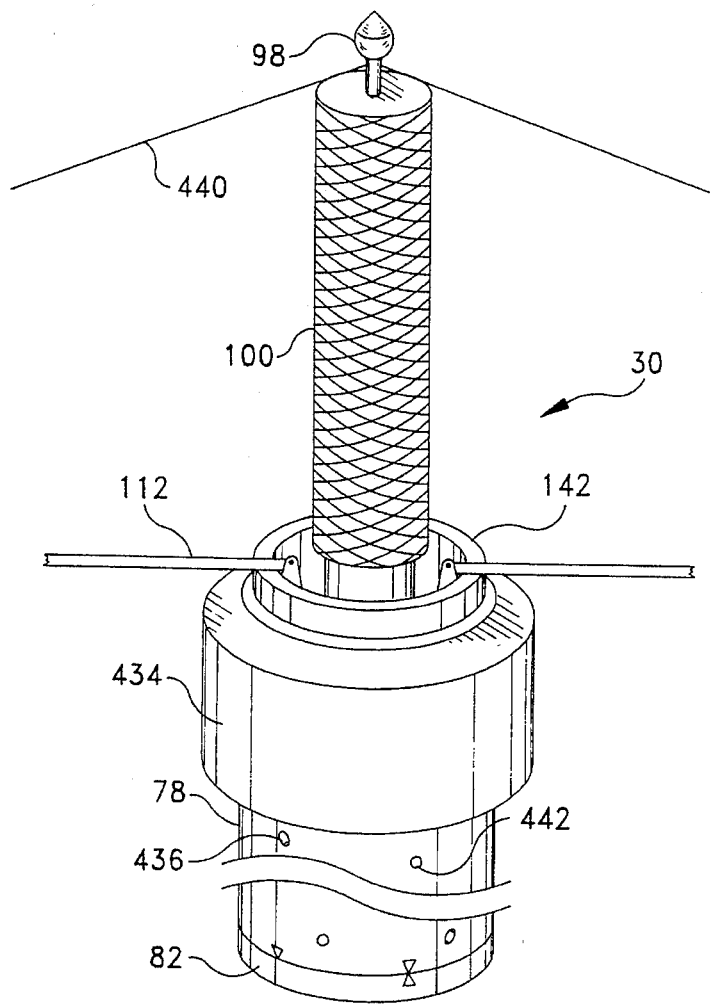
FIGS. 21A-D show a beacon-case combination suitable for water deployment in accordance with the present invention.
Figure 21C:
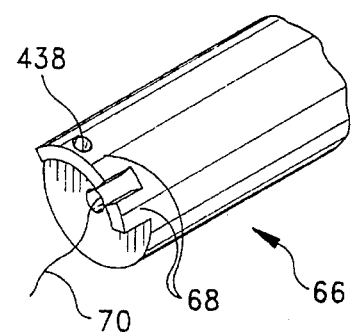

Refer now to FIGS. 21A–D. When the beacon 40 (FIG. 2) is to be carried by an aircrew who may be downed over water, the beacon storage/carrying case 74 of FIGS. 3A and 3B is modified by attaching an inflatable bladder 432 just below the top edge of the main case body 78. Prior to use, the inflatable bladder 432 is encased in a removable cover 434. An additional alignment aperture 436 is in the case 78. For deployment, the downed air crew would remove the cap 76 (FIG. 3B) from the case 78, partially pull the beacon 40 out of the case 78 and rotate the beacon 40 until an alignment aperture 438 in the keying tabs 68 is even with the alignment aperture 436; at which time the pin 84 or screw 85 is removed from the base cap 82 and inserted into the apertures 436 and 438 to maintain the position of the beacon 40 in the case 78. At that time, the motor 48 (FIG. 4A) is removed, releasing the shrouds 56 (FIG. 4A) and deploying the counterpoise 112. The bladder cover 434 is removed and the inflatable bladder 432 inflated either by a $CO_2$ cartridge or by mouth in the same manner as the means to inflate a life jacket. FIG. 21A depicts the configuration after the motor 48 and shroud 56 have been removed, but prior to bladder inflation. Following counterpoise 112 deployment, the ball 98 is pushed to apply power to the beacon 30. The tether 70 normally would be attached to either a life jacket or life raft.

Figure 21B:
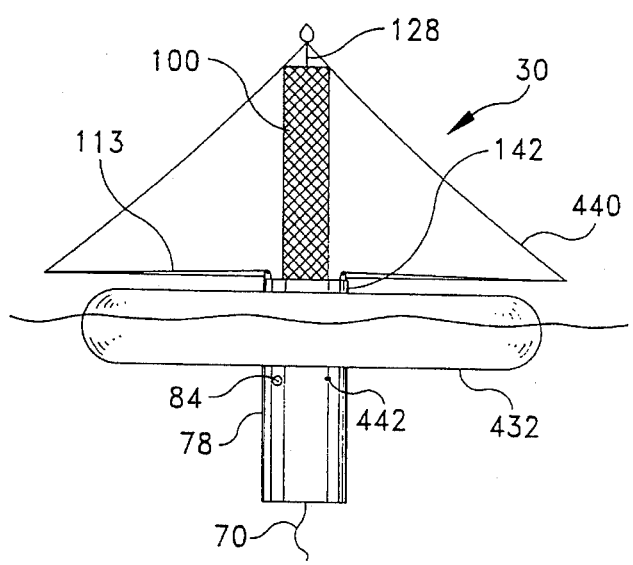
Figure 21D:
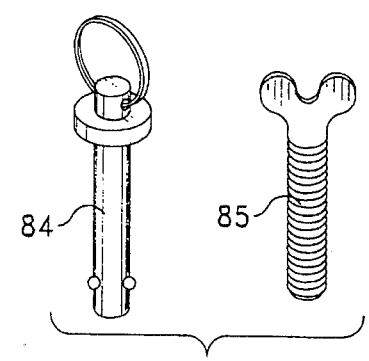

An option to the beacon 30, as best shown in FIG. 21B, is a protective canopy 440 attached to the counterpoise wires 113 and to the rod 128 as well as extending inward from the wires 113 to the electronic assembly case 142. The purpose of the protective canopy 440 is to minimize the possibility of wave action shorting the antenna 100 during deployment. The canopy 440 deploys upon removal of the shroud 56 and extension of the counterpoise 112.

An auxiliary flood hole 442 can be employed in the case 78 to allow water to enter and aid in maintaining the beacon 30 in an upright orientation. FIG. 21B shows the deployment of the beacon 30 on the surface of the water.

(17) Advantages, Alternatives, and New Features

There has therefore been described a ground unit that provides a means to verify beacon operation by the deploying ground forces. It also provides ground forces with the means to detect, identify, and subsequently navigate to the beacon site. The equipment to perform these functions is a small, lightweight addition to any of a wide variety of standard transceivers used by ground forces; thereby minimizing the specialized equipment needed to perform the functions.

The present ground unit does not provide all of the functions mentioned in copending application, Navy Case No. 74644, An Airborne System for Detection, Identification, Direction and Distance Determination, and Flare Activation of a Marker Beacon. The ground unit does not provide the means for distance-to-go information to the ground forces using the system, nor does it provide for remote beacon flare activation by the forces. An alternative is to incorporate these capabilities in the add-on electronics to the transceiver. Ground forces utilizing vehicles for transport while navigating to the beacon, vice foot-power, could also incorporate the visual display used in the airborne system for beacon identification.

It will be understood that various modifications may be provided with respect to the materials, steps, arrangement of parts, and other details which have been described and illustrated in order to explain the nature of the invention. For example, any suitable source of infrared energy emissions can be substituted for the pyrotechnic flare disclosed hereunder. It will be understood that such modifications which can be made by those skilled in the art are within the principle and scope of the invention as expressed in the appended claims.

What is claimed is:

1. A ground unit for use in conjunction with a marker beacon comprising:

detection and identification means for detecting and identifying a marker beacon upon receipt of predetermined radio signals;

direction determination means for determining the direction of said marker beacon; and said detection and identification means further comprising a code selector having code selection means for selecting an identification code, a pair of hand-held receiver antennas for receiving identification code group signals, said hand-held receive antennas having means for indicating the relative strength of signals received at each hand-held antenna with respect to the other hand-held antenna, a receiver having a receiver network and a switch for connecting one at a time each of said pair of receive antennas to said receiver network, a pulse width discriminator connected to receiver network and having a pulse width discriminating means for checking the pulse width of the received signals, a one-shot multivibrator connected to said pulse width discriminator, said one-shot multivibrator having signalling means for providing an output signal when the pulse width of the signals at the pulse width discriminator meet predetermined criteria, a correlator connected to said code selector for receiving said selected identification code and to receive said output from said multivibrator, said correlator having identification code means for determining if said received signal meets said identification code criteria and for providing an output signal if such criteria is met, and information means connected to receive said correlator output signal for providing information of the detection and identification of said marker beacon and said information means further comprising one of a handset and a pair of headphones providing an audio signal.

* * * * *